March 16, 1965
C. G. SVALA
3,173,999
DEVICE FOR AUTOMATIC MEASUREMENT OF ENVELOPE
DELAY AND ATTENUATION DISTORTION
Filed July 31, 1961
9 Sheets-Sheet 1
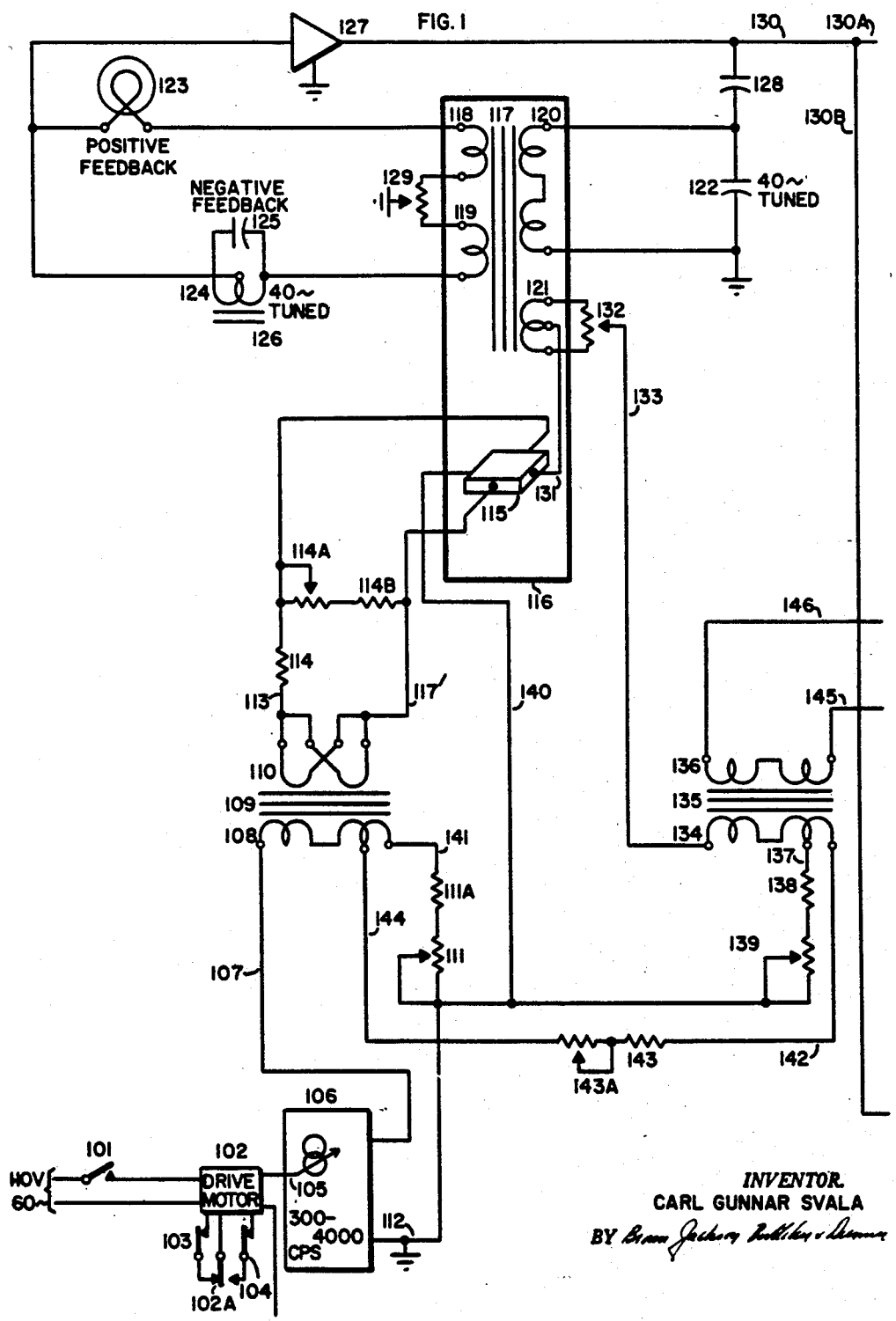
INVENTOR.
CARL GUNNAR SVALA

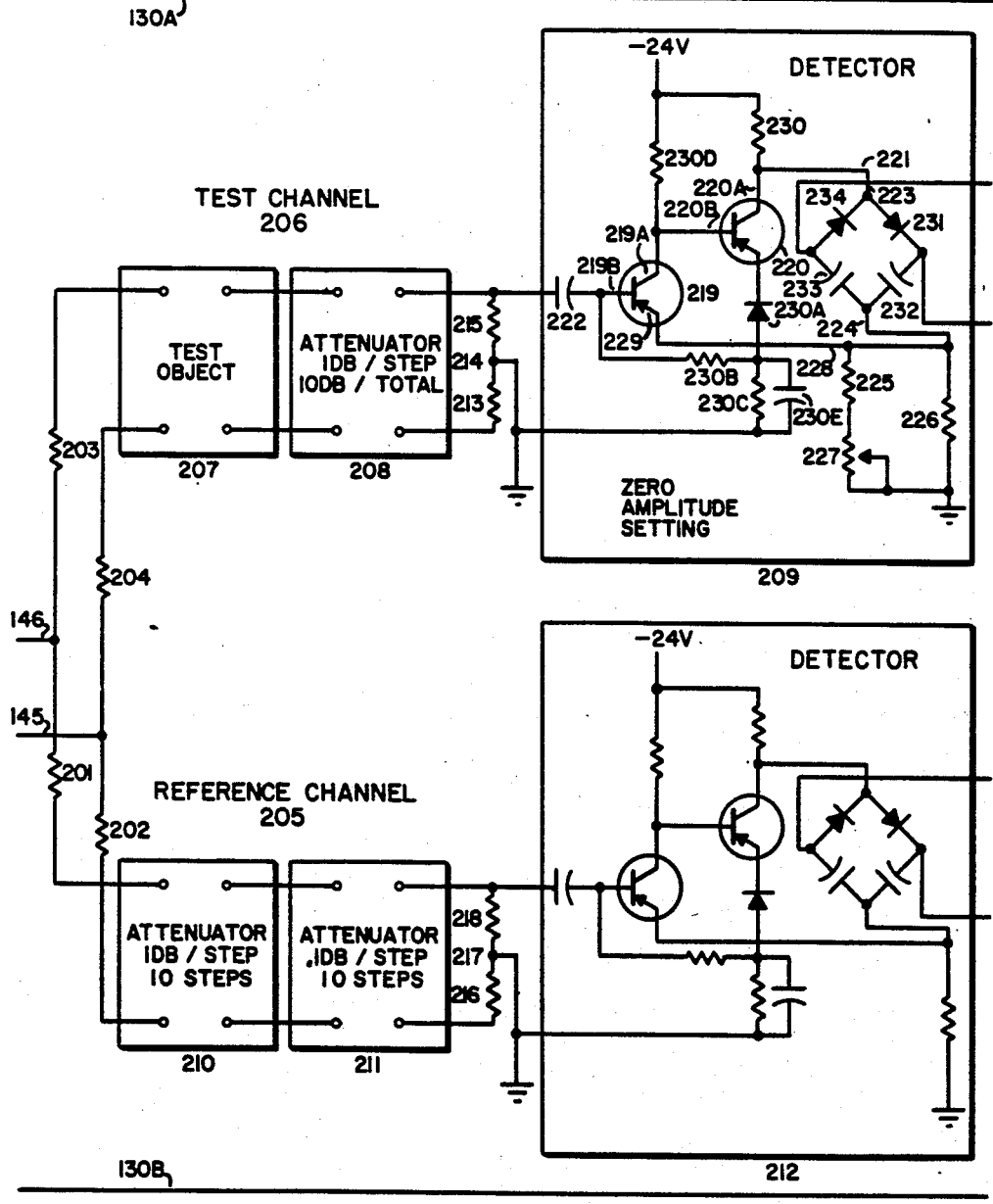

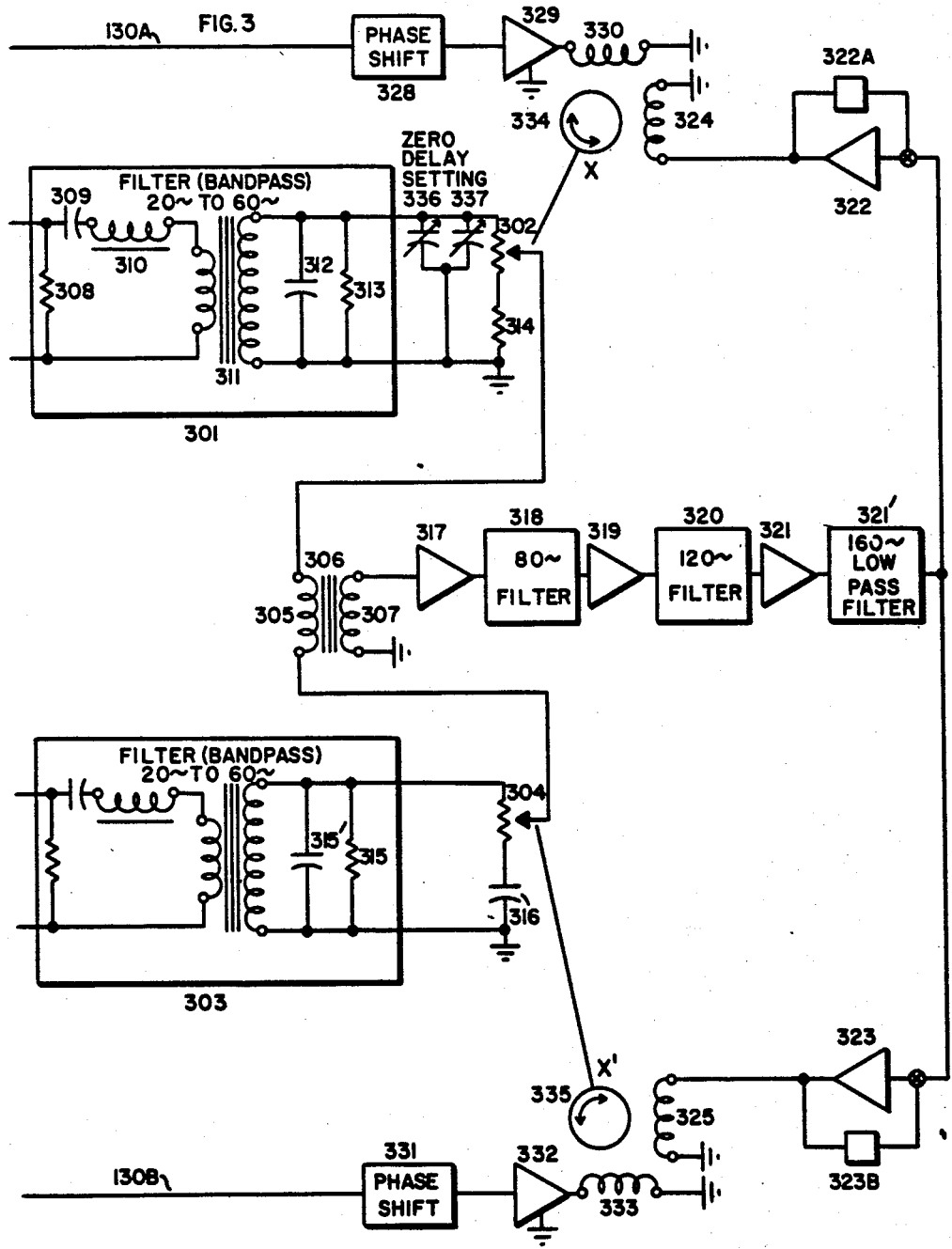

March 16, 1965 C. G. SVALA 3,173,999
DEVICE FOR AUTOMATIC MEASUREMENT OF ENVELOPE
DELAY AND ATTENUATION DISTORTION
Filed July 31, 1961 9 Sheets-Sheet 4
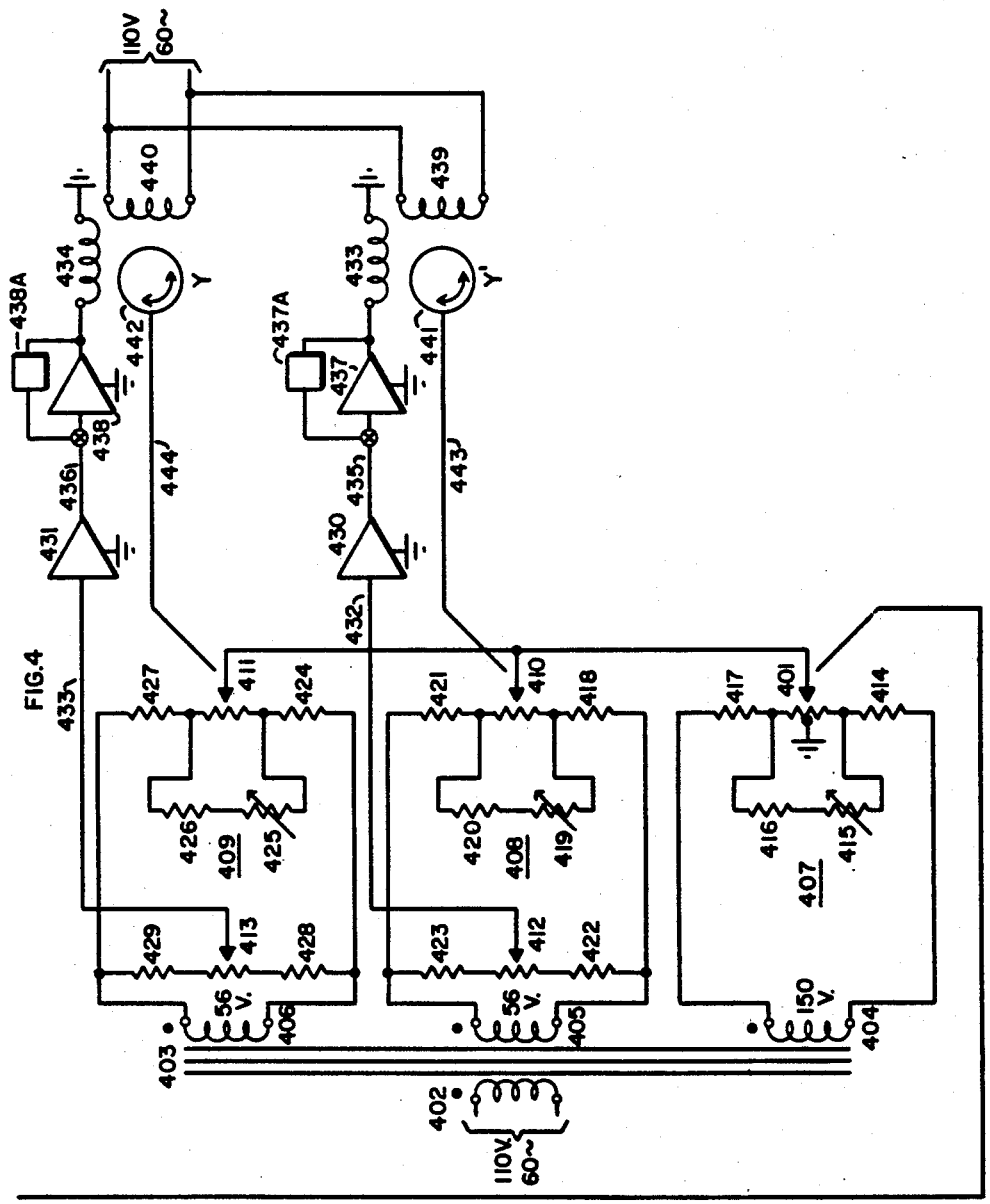
INVENTOR.
CARL GUNNAR SVALA

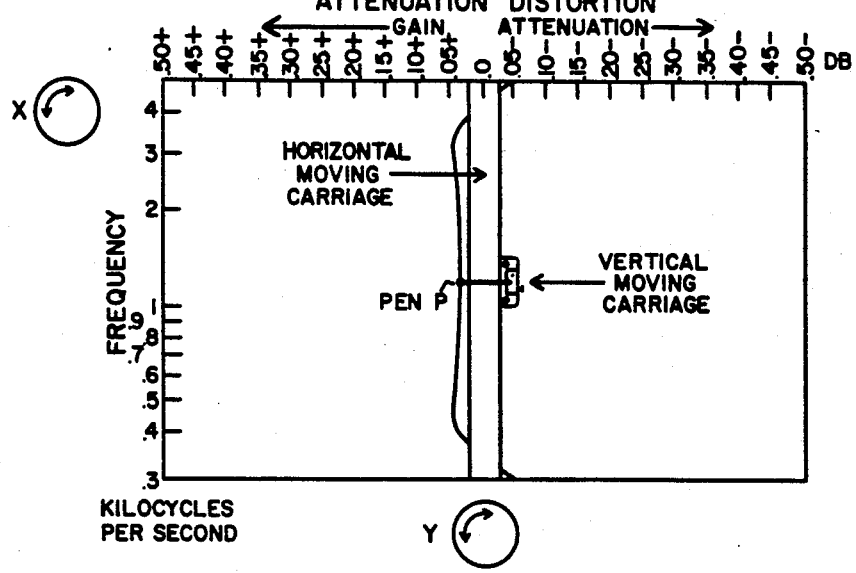
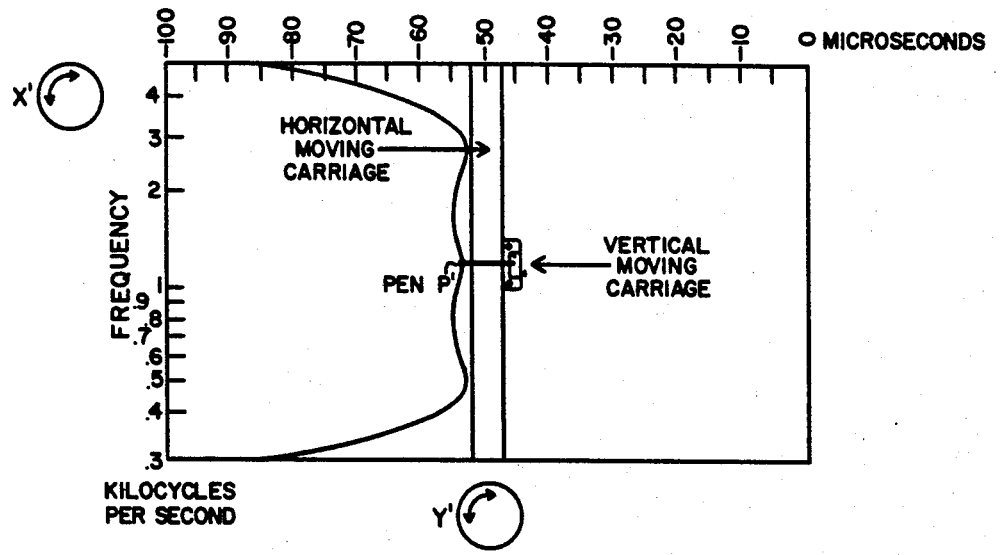

FIG.7A  FIG.7B  FIG.7C
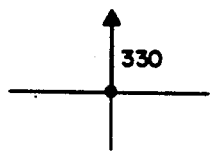 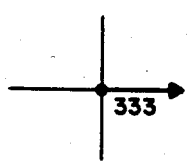 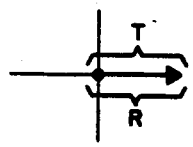
FIG.7D  FIG.7E  FIG.7F  FIG.7G
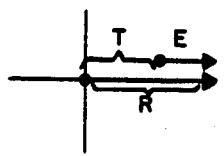 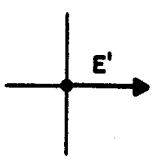 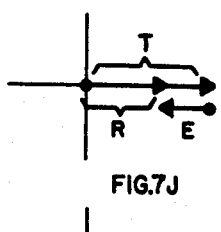 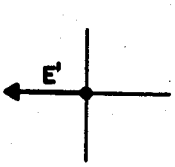
FIG.7H  FIG.7I  FIG.7J  FIG.7K
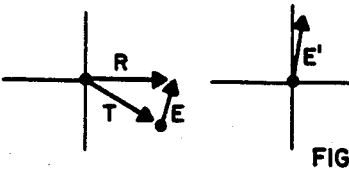 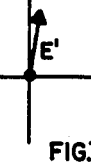 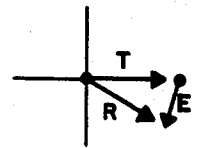 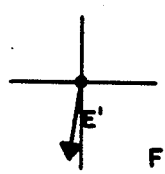
FIG.7L  FIG.7M  FIG.7N  FIG.7P
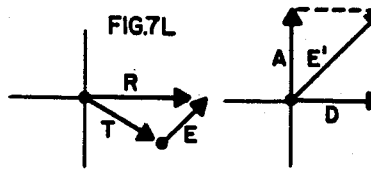 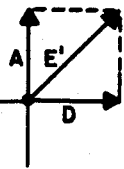 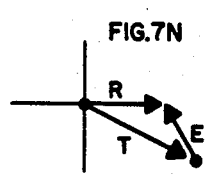 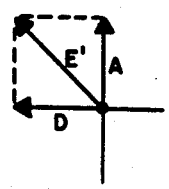
FIG.7Q  FIG.7R  FIG.7S  FIG.7T
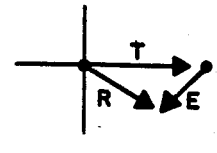 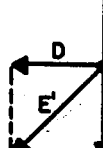 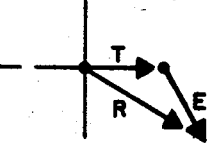 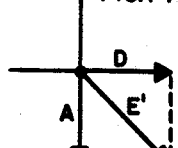
*INVENTOR.*
CARL GUNNAR SVALA

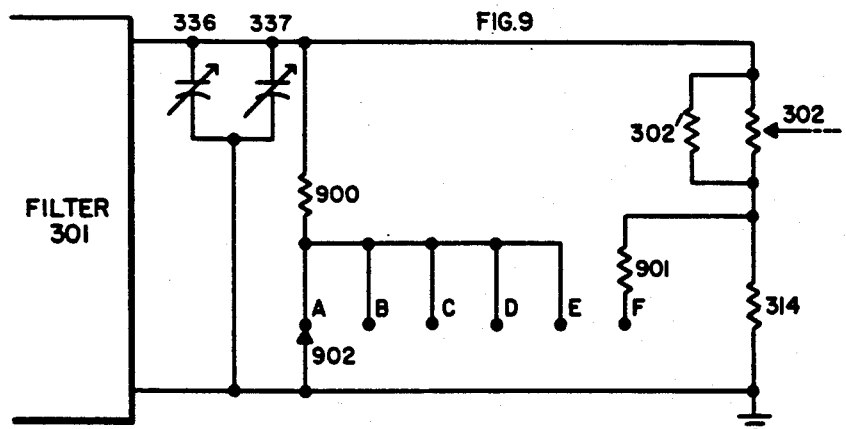
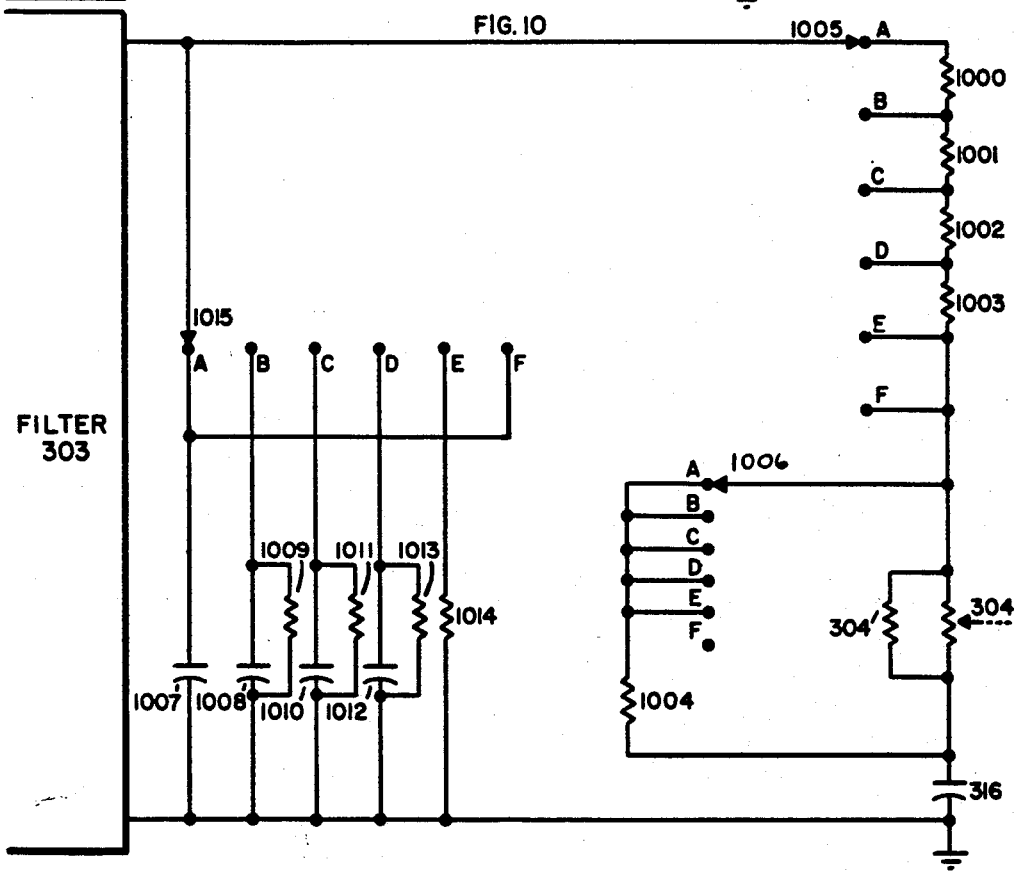

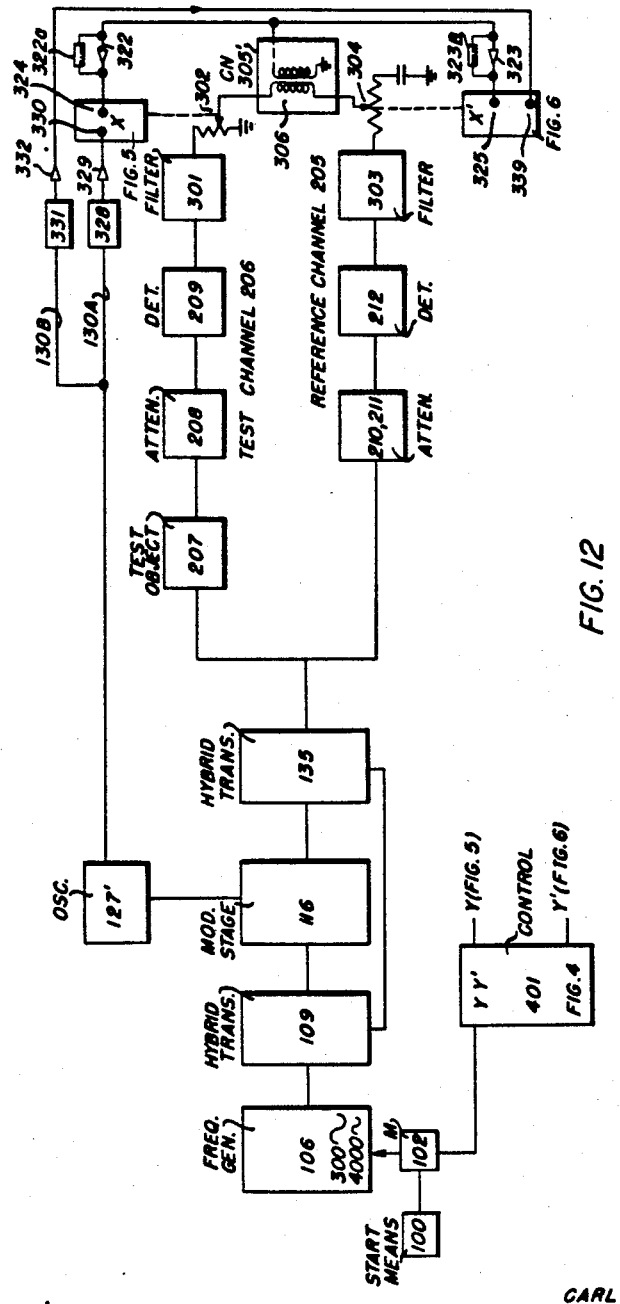

United States Patent Office 3,173,999
Patented Mar. 16, 1965

3,173,999
DEVICE FOR AUTOMATIC MEASUREMENT OF ENVELOPE DELAY AND ATTENUATION DISTORTION
Carl Gunnar Svala, Galion, Ohio, assignor to North Electric Company, Galion, Ohio, a corporation of Ohio
Filed July 31, 1961, Ser. No. 128,261
19 Claims. (Cl. 179—175.1)

The present invention is directed to a novel automatic measuring device for use in the measurement of certain transmission characteristics of a transmission path, and specifically in the measurement of envelope delay and attenuation distortion of waveforms on a transmission path.

In the transmission of voice and signal waveforms over a transmission path, a delay occurs during the period in which the signals are propagated from the input end to the output end of the transmission path, the electrical characteristics of the components on the path, the cable loading, the path length, and other similiar path characteristics determining the length of the delay for a given path. The delay on a path may also vary with the frequency of the signals transmitted over the path. In the transmission of a waveform consisting of different frequencies over such path, therefore, the different frequencies in the waveform may be transmitted at different velocities and the shape of the waveform may be materially varied or distorted in its travel over such path. Waveform distortion of such type is known in the art as delay distortion.

The consequences of delay distortion in the transmission of speech signals (0–4 kc.) over a path in a telephone system were previously not normally considered serious in that the human ear is not generally sufficiently sensitive to detect delay distortion of such order in the speech frequency range. However, there is an increasing use of telephone networks for the transmission of data signals at increased speeds (such as 3000–4000 bits of information per second) and the distortion of data signals as the result of such delay cannot normally be tolerated since the information represented by the distorted waveforms will be received in a mutilated condition at the terminating end of the path. Such problem is especially serious in installations in which tandem or cascade links are used to propagate data information over long distances. Specifications for new equipment which is adapted for use in such manner now, therefore, frequently require that the transmission path have a delay distortion of no more than ±10 microseconds over a frequency range of 300 to 3400 cycles.

As a result of the requirement for transmission paths having signal propagation characteristics of this order, a need has developed in the art for a measuring device which is capable of providing precise, accurate, reliable measurements of envelope delay and attenuation, and it is a particular object of the present invention to provide a measuring device having such operating characteristics which is operable to provide a printed record of the measurements obtained for a given frequency range with a resolution of better than 1 microsecond.

It is known that envelope delay is equal to the derivative of phase shift vs. angular frequency, and is expressed as $d\phi/d\omega$, where $\phi$ is the phase lag in radians between the input and output of the transmission path, and $\omega = 2\pi f$ where $f$ is the frequency. In the case of an amplitude modulated signal with carrier $f_c$ and sidebands of $\pm f$, the delay of the envelope will be determined by $d\phi/d\omega$ in which $\omega = 2\pi f_c$ and in which $f_c$ is the center frequency, provided the sidebands are relatively close to the center frequency.

In arrangements in which an approximation of the envelope delay on a transmission path is sufficient, a measurement of envelope delay may be accomplished by transmitting signals of different frequency values over the path to be tested at successive time intervals, and noting the value of $\phi$ on a phase meter at the successive intervals and plotting the resultant signals versus frequency. The value of the envelope delay $$\left(\frac{d\phi}{d\omega}\right)$$

may then be calculated by determining the slope of the phase plot at the different frequencies.

Such method, however, is extremely tedious. As noted above, the value of the envelope delay experienced in a network may vary with the transmission of different frequencies thereover, and the bandwidth for a piece of equipment may extend from 300 cycles/sec. to 4000 cycles/sec. Obviously the adjustment of equipment over an extended range of this order, and reading and plotting the signals obtained in such operation are extremely time consuming. Of even more consequence, in the case of a path in which the delay exhibits a fine structure—that is, small amplitude excursions, still rapidly varying with frequency—it is necessary to make measurements at very small frequency increments with correspondingly small phase increments, whereby the accurate determination of the phase changes at such points is difficult, if not impossible.

It is a further object of the present invention therefore to provide a measuring system which provides a more accurate measurement of envelope delay in a more expeditious manner. Such object is basically achieved with a novel test system which includes signal generator means for simultaneously transmitting a carrier frequency variable, for example, from 300–4000 cycles and modulated by a very low frequency (such as for example 40 cycles per second) over two substantially identical channels including a first or test channel in which the equipment to be tested is connected, and a second or reference channel. As the carrier signal and its sidebands are transmitted through one of the channels, the sidebands encounter a phase difference corresponding to the average envelope delay over the small frequency band between the two sidebands. By demodulating the sidebands against the carrier frequency a signal of the modulation frequency is recovered, which exhibits an amplitude and phase change with reference to the original modulating signal, directly representing the attenuation and envelope delay. Simultaneously a like set of signals is transmitted over the other channel, and comparison of the output signals of the two channels for each point then provides the envelope delay and attenuation distortion which occurs in the test object.

The use of a low modulating frequency is predicated to maintain $d\phi/d\omega$ approximately constant over the range between the sidebands and accordingly make the measured value of the envelope delay represent the delay at the center frequency $f_c$. It can be shown however, that with a modulating frequency of 40 cycles for instance, comparison between the two demodulated signals must be made with an accuracy of 1/4000 to make the error in delay less than 1 microsecond. In order to maintain an error signal of this magnitude, that is a relative level of −72 db, all other non-wanted signals in the transmission path, such as harmonics and high order intermodulation products also must be kept below −72 db relative level.

It is a further object of the invention to provide a measuring device which includes test and reference paths which maintain distortion and intermodulation at an extremely low level, and specifically to a level as low as −72 db below signal level.

In the accomplishment of paths which transmit amplitude modulated signals with attenuation and delay distortion of a low order, novel circuit arrangements are provided for the modulator and oscillator units which couple the signals to the paths to maintain signal distortion at a minimum, and particularly to minimize distortion which might be introduced into the path by the harmonic and inter-modulation products present in the output from most conventional forms of modulators. In order to establish a highly stable and linear modulation, a Hall-effect modulator is utilized. To further decrease distortion, it is operated as a balanced modulator, thus utilizing its most linear range. Accordingly, the carrier signal must be added to the sidebands generated in the modulator. In order to avoid multiple modulation resulting in higher order sidebands, the carrier signal is added through a hybrid circuit preventing the carrier from entering the output circuit of the modulator. As the Hall-effect modulator generates second order sidebands in its input circuit, this circuit is isolated from the carrier reinsertion circuit by another hybrid circuit. In the Hall-effect modulator, the modulation is effected by a magnetic field generated in an iron core magnetic circuit excited by the modulating frequency. In order to reduce higher order sidebands due to harmonics in the magnetic field caused by non-linearity of the iron, the magnetic circuit, used as a transformer, is made part of the oscillator circuit for the modulating frequency. A sense winding on the core close to the Hall-wafer provides, through a frequency discriminating circuit, a strong negative feedback for all harmonics generated in the field, thus minimizing this distortion. These and other circuit innovations, as taken in combination, result in a train of signals which provides more accurate and precise measurement.

The detection of the envelope delay in the novel system is basically effected by comparing the delay of each frequency signal in its transmission over the test channel relative to its transmission over the reference channel, comparing the signal output of the test and reference channels, providing a resultant error signal to a servo system to control same to adjust the attenuation in the test channel, and to adjust the delay in the output of the reference channel, in amounts sufficient to reduce the error signal to zero; and recorder means controlled by movement of the servo system in such adjustments to provide a printed record of the envelope delay and attenuation distortion observed by the system at the different frequencies.

In the detection of the error signal, a balancing arrangement with a null type sensor is used to provide extremely accurate and precise measurement. Further, in the introduction of delay into the reference channel for the purpose of controlling the equipment in the null sensing operation, an RC network is used in such manner that the demodulated frequency in the reference path does not affect the delay as introduced and a further increase in measurement accuracy is obtained.

As yet another feature basic to the accomplishment of precise records of the measurement of envelope delay and attenuation distortion, each servo system includes a novel bridge control arrangement having one winding thereof connected as a leg in the bridge to obtain a velocity component for coupling to the input of the power amplifier in such phase as to provide optimum braking, and of an amplitude which is continually related to the velocity of the servo. Such system is important to the prevention of "overshoot" or "hunting" while yet providing protection against error signal feedback.

These and other advantages of the present invention will become apparent with reference to the following specification and accompanying drawings wherein basic embodiments of the structure are illustrated, and in which:

FIGURES 1–4 set forth a circuit diagram of the envelope delay measuring system;

FIGURES 5 and 6 are schematic representations of a pair of X—Y recorders in the system which are controlled to provide graphs of the envelope delay and attenuation distortion for a test object connected in the system.

FIGURES 7A–7T are vector diagrams setting forth the manner of operation of the servo system of the measuring device;

Figure 11:
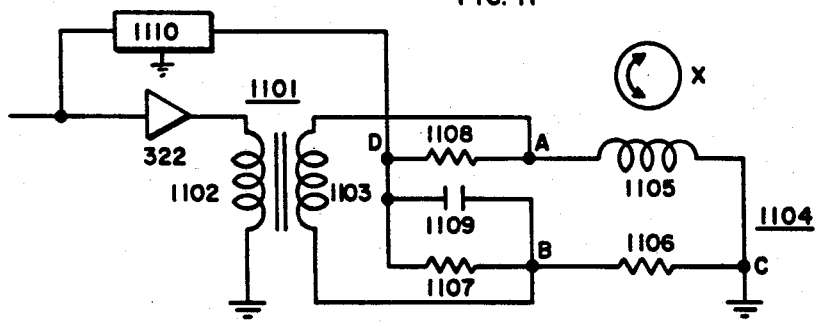

FIGURES 9 and 10 set forth circuit arrangements which are used to provide greater flexibility in the use of the novel device;

FIGURE 11 is a circuit diagram of the novel velocity control arrangement for the servo motors; and FIG. 12 is a block diagram of the novel system.

GENERAL DESCRIPTION

With reference to FIGURE 12, the novel measuring device basically comprises a system start means 100, a drive motor 102 connected to control the adjustment of a frequency generator 106 in the generation of a set of signals which vary in frequency from 300–4000 c.p.s., and simultaneously to control a potentiometer 401 (FIGURE 4) in the operation of servo motors Y, Y' for two X—Y recorders (FIGURES 5–6) which may be of the type commercially available as 3S X—Y recorders from F. L. Mosely Company, and which are respectively connected to provide graphs of the attenuation distortion and envelope delay for a test object as connected in the system.

The frequency output of the variable frequency generator 106 is coupled over transformer 109 and associated circuitry, to a modulator stage 116 and a coupling transformer 135, and also over a second path including the primary winding of transformer 109 to coupling transformer 135. The signal output of coupling transformer 135 is connected to a test channel 206 and a reference channel 205.

An oscillator circuit 127' coupled to modulator stage 116 provides a forty cycle signal output for effecting amplitude modulation of the 300–4000 c.p.s. frequency signal output from frequency generator 106, and modulator stage 116 couples signals to coupling transformer 135 comprising 40 cycle sidebands on either side of the momentary 300–4000 cycle signals with the 300–4000 cycle signal removed due to balanced modulation. The carrier signal output which is coupled from frequency generator 106 over the second path to the coupling transformer 135 insures the provision of 300–4000 cycle carrier modulated by 40 cycles to the reference and test channels 205 and 206.

The test channel 206 for test object 207 basically includes attenuator 208, detector 209, and filter 301. An adjustable attenuation inserting network including adjustable potentiometer 302 is connected between the filter output and a comparison circuit 305' including transformer 306. The reference channel 205 is substantially identical to the test channel 206 and includes attenuators 210, 211, detector 212, and filter 303. A delay inserting network including adjustable potentiometer 304 is connected between the filter output and transformer 306 in the comparison circuit means 305'.

The output signals of the test and reference channels 205, 206 are forty cycle signals, which as compared in the transformer 306 will yield an error signal related to the envelope delay and attenuation distortion which occurs in the test object connected in the test channel 206.

The error signal provided over transformer 306 as a result of the comparison of the signals provided by the two paths is coupled over comparison circuit 305' (which as shown in FIGURE 3 comprises, in addition to transformer 306, amplifier 317, 80 cycle filter 318, amplifier 319, 120 cycle filter 320, amplifier 321, 160 cycle filter 321') to power amplifier circuits 322, 323 and the windings 324 and 325 on servo motors X, X' respectively. Velocity control feedback circuits 322a and 323b minimize hunting by the servo units X and X' respectively. The error signal is now compared in a servo system with a reference signal derived from the modulation stage, a second winding 330 on servo motor X being coupled to the output of the forty cycle oscillator circuit 127' (FIGURE 1) over conductor 130A, phase shift network 328 and amplifier 329, and a second motor 333 on servo winding X' being connected to the forty cycle oscillator circuit 127' over conductor 130B, phase shift network 331 and amplifier 332.

As shown hereinafter the servo motor X operates to insert sufficient attenuation into the test channel 206 to reduce the difference in the attenuation in the reference and test channels 205, 206 to zero, the movement of the servo motor X in such adjustment effecting a corresponding horizontal movement of the pen P (FIG. 5) to record the change effected, and thereby the attenuation distortion.

In a similar manner, the servo motor X' is operated to insert sufficient delay in the reference channel 205 to adjust the difference in the delay in the reference and test channels 205, 206 to zero, the movement of the servo motor X' in such adjustment effecting a corresponding horizontal movement of pen P' (FIGURE 6) to record the change effected, and thereby the envelope delay of the test object.

As noted above, as the drive motor 102 is energized to drive the variable frequency control 105 for frequency generator 106 uniformly through its range in a linear fashion in the provision of a frequency which changes logarithmically, the motor 102 also operates potentiometer 401 through its range in a linear fashion to energize the control circuitry (FIGURE 4) for servo motors Y and Y' to advance the pen recorders (FIGURES 5–6) vertically in a linear manner whereby records are made on graph paper having a logarithmic vertical scale so that the resultant trace takes into account the logarithmic frequency change of the output from generator 106.

The two XY recorders as thus controlled by the servo motors X, X', and Y, Y' respectively, record the envelope delay and attenuation distortion detected by the system on 8½ x 11 graph paper. As shown in FIGURE 5, servo motor X on the first recorder is controlled by the attenuation distortion signal to drive the horizontal carriage along the X axis, and the servo motor Y is controlled with changes in the output frequency of the generator 106 to drive the vertical carriage (which is carried by the horiozntal carriage) along the Y axis, whereby pen P which is mounted on the vertical carriage records attenuation distortion vs. frequency. As shown in FIGURE 6, servo motor X' on the second recorder is controlled by the phase component of the error signal to drive the horizontal carriage of the second recorder, and servo motor Y' is controlled by frequency changes in the output frequency of generator 106 to drive the vertical carriage of the recorder there shown along the vertical axis, whereby pen P' on the second recorder (FIGURE 6) records envelope delay vs. frequency.

SPECIFIC DESCRIPTION

The specific structure of the system and the specific manner in which the system effects the measurement of the envelope delay and attenuation distortion of a test object for each of a number of different frequencies are now set fort in detail.

*Generation of modulated signals for transmission over test and reference paths*

The variable output of the 300 to 4000 c.p.s. frequency generator source 106 is coupled to the control system for the Y, Y' servos and simultaneously over a path comprising conductor 107, the primary winding 108 of hybrid transformer 109, conductor 141, resistors 111 and 111A, and conductor 112 which is grounded back to generator 106. An induced signal in the secondary winding 110 of transformer 109 passes over an input path to the modulator stage 116 comprising conductor 113, resistor 114, the Hall effect crystal plate 115 of a "Halltron" device, conductor 117, and back to the secondary winding 110.

The "Halltron" type device which is a magnetic circuit device commercially available in the field comprises a magnetic core 117 having windings 118, 119, 120, and 121; and a Hall plate 115 comprising a wafer from a semiconductor crystal oriented with its flat plane surface at right angles to the flux of the magnetic core 117 which passes therethrough. Winding 120 with capacitor 122 thereacross constitutes a resonant circuit tuned to 40 cycles and is connected over capacitor 128 to the output circuit of amplifier 127. Winding 118 is connected with potentiometer 129 and lamp 123 in a positive feedback circuit for amplifier 127; winding 119 is connected with a potentiometer 129 and a parallel resonant circuit 124 in a negative feedback circuit; "Dither" winding 121 is connected in the output circuit of the modulator stage 116 to provide a signal output from conductor 131 and transformer 117 over adjustable potentiometer 132 and output conductor 133 for the modulator stage 116 to the primary winding 134, of coupling transformer 135. This connection of the "Dither" winding 121 in the output circuit of the crystal member 115 provides a balancing means for cancelling any 40 cycle component in the output of the modulator which is directly induced by the magnetic flux.

The output signals of amplifier 127 are coupled over coupling condenser 128, and the resonant circuit comprising winding 120 and condenser 122 to ground which causes the oscillator system to oscillate at 40 cycles.

The oscillation is sustained by a positive feedback circuit which can be traced from ground through potentiometer 129, winding 118, lamp 123, and amplifier 127 to ground. As noted above, the negative feedback circuit extends from ground over potentiometer 129, winding 119, tuned circuit 124, and amplifier 127 to ground.

The resonant circuit 124 is a parallel resonant circuit which is sharply tuned to a high impedance at 40 cycles and a relatively low impedance at other than 40 cycles. Accordingly, the tuned circuit 124 provides negative feedback over-riding for the positive feedback circuit on other than 40 cycles, and due to the high impedance of circuit 124, offers little negative feedback at 40 cycles, resulting in overall positive feedback at 40 cycles. This arrangement keeps the oscillations at precisely 40 c.p.s. and substantially minimizes the amount of harmonic distortion. The resistance of lamp 123 varies with the oscillation level in such manner as to reduce the amount of positive feedback with increasing amplitude. Accordingly, the oscillation amplitude will stabilize at the desired level, where the net positive feedback will just suffice to maintain oscillation. Manual movement of the slider of potentiometer 129 regulates the oscillation level.

The forty cycle current signals output from amplifier 127 are coupled over conductor 130 and conductors 130A and 130B in the direction of servos X and X' for reference purposes, as more fully set forth hereinafter. The 40 cycle signals are also coupled to "Dither" winding 121. As noted above winding 121 and potentiometer 132 (which may be manually set to provide different values of compensating voltage), are connected in an output for the Hall plate 115, which circuit further extends over output conductor 133, primary winding 134 of hybrid transformer 135, conductor 137, resistor 138, variable resistor 139, conductor 140, Hall plate 115 and the center tap of winding 121. Potentiometer 132 is manually adjusted to eliminate any spurious forty cycle signals in such output circuit.

The input and output circuits of the Hall plate (115, 131, respectively) are at right angles to each other, and the flux path at right angles to the plane determined by the input and output circuits through the plate. As a result the 300–4000 c.p.s. current coupled to the input circuit by hybrid transformer 109 is modulated by the 40 cycle current occasioned by the flux and results in a signal in the output circuit 131 of the Hall device which consists of 40 cycle sidebands on either side of the momentary 300–4000 cycles with the 300–4000 cycle signal removed due to the balanced modulation provided by the "Halltron" type modulator. The modulator unit has extremely linear modulation over the desired range, and by use of the balanced modulation to remove the carrier, operation of the modulator at the center of the most linear portion of its modulation curve is insured.

However, if the sidebands with removed carrier were projected over hybrid transformer 135 to the test and reference channels, the correct demodulation in the detectors would require insertion of the carrier there, with attendant complications including phasing, to recover the 40 cycle signal. To obviate this, the carrier is coupled to the primary winding 134 of hybrid transformer 135 over a path which extends from the primary winding 108 over conductor 141, resistor 111, 111A, potentiometer 139, resistor 138, conductor 137, the right hand portion of primary winding 134, conductor 142, resistors 143 and 143A, and conductor 144, back to a tap on the primary which places the right hand portion of primary winding 108 in the carrier insertion circuit.

The signal output of the secondary winding 136 of hybrid transformer 135 comprises carrier of 300–4000 cycles modulated by 40 cycles which is coupled over conductors 145 and 146 through resistors 201 and 202 to the reference channel 205 and over resistors 203 and 204 to the test channel 206.

At this point it is noted that the lower modulating frequency of forty cycles was selected to achieve the desired resolution in delay, and particularly to maintain the $d\phi/d\omega$ ratio constant over the frequency range between the sidebands. As noted heretofore the degree of resolution obtained is in the order of $250 \times 10^{-6}$ or less than 1 part in 4000. Although the use of a smaller modulation frequency would further improve the resolution, it is increasingly difficult to provide cooperating circuitry which is capable of operation without introducing distortion and intermodulation of a level which prevents achievement of the desired degree of resolution.

Thus, in the disclosed arrangement the components are connected in a combination which minimizes distortion and intermodulation to a degree which results in a low level corresponding to approximately 72 db below the channel output signals. In accomplishing such manner of operation, a common magnetic circuit is used for the modulation and the oscillator circuit to minimize any distortion which may be due to the non-linearity of the iron in the magnetic circuit which with, the negative feedback of circuit 124, will counteract distortion generated in the magnetic circuit.

Since the distortion would also appear as an induced voltage (opposed phase) in the windings 119, 120 the capacitor 122 of the tuned circuit in effect short circuits harmonic voltages in the magnetic circuit to reduce distortion. The tuning further increases the impedance and accordingly reduces the loading of the amplifier 127 so as to minimize distortion in the output thereof.

In providing the proper generator impedance for the semiconductor crystal 115, a shunt comprised of resistors 114A, 114B is connected across the crystal input. Proper adjustment of the shunt minimizes harmonic distortion in the output circuit of crystal 115, and particularly harmonics appearing as sidebands of the third order; i.e., ±120 cycles from the carrier in addition to the ±40 cycle sidebands. With adjustment of the generator impedance for the crystal to the proper value by adjustment of resistor 114A, the amount of high order sidebands is reduced in the present arrangement to −70 db compared to the first order sidebands.

To further preclude any sideband signals which might appear in the input of the crystal device 115 from reaching the coupling transformer 135 over the carrier insertion path including resistors 111, 143, etc., the primary of transformer 109 is connected in a hybrid arrangement. A hybrid arrangement is also connected in the primary of the coupling transformer 135 to prevent the carrier signal on conductor 142 from entering the output circuit of the crystal 115, and thereby prevents introduction of plus and minus 40 cycle sidebands in the primary circuit of the crystal device 115 which would be remodulated by passing through the modulator a second time to provide 80 cycle sidebands in the output circuit.

Resistor 111 is adjusted for the generator internal resistance, and resistance 139 is adjusted to the load impedance of the secondary winding of coupling transformer 135. Resistor 143A is adjusted to provide the desired level of the carrier signal and particularly the degree of modulation (.5 in the disclosed arrangement).

*Test and reference channels*

The 300–4000 cycle carrier signals modulated by the 40 cycle signal, as noted above, are coupled to the test channel 206 and the reference channel 205. As the modulated wave passes through the test channel 206 comprising the test object 207, an attenuator 208, a detector 209, and a 20–60 c.p.s. bandpass filter 301 to an attenuation inserting circuit including resistor 302, a voltage proportional to the amplitude of the 40 cycle envelope appears between ground and the slider of potentiometer 302. Also, as the modulated wave passes through the reference channel 205 comprising attenuators 210 and 211, a detector 212 and a 20–60 c.p.s. bandpass filter 303 to a delay inserting circuit including resistor 304, a voltage proportional to the amplitude of the 40 cycle envelope appears between ground and the slider of potentiometer 304.

It should be appreciated that the envelope which is propagated over the test object 207 in the test channel 206 may be displaced in time and may deviate in amplitude relative to the envelope propagated over the reference channel 205, due to the attenuation and delay characteristics of the test object 207. As shown hereinafter, for the purpose of determining such characteristics the slider of potentiometer 302 is connected to the upper terminal of the high impedance primary 305 of transformer 306; and the slider of potentiometer 304 is connected to the lower end of the primary 305 of transformer 306. With the connection of the output signals of the two channels to opposite terminals of the transformer 305, a difference signal is passed over transformer 306 and the path including filter and amplifier circuitry to servos X and X'.

The amplitude component of the difference signal causes the servo motor of servo X to rotate and move the associated pen P (FIGURE 5) either back or forth horizontally according to the error signal representative of attenuation, and simultaneously to operate the slider of potentiometer 302 in the direction which tends to reduce the difference to zero.

The out-of-phase component of the difference signal effects rotation of the servo motor X' which causes the associated pen P' to move back or forth horizontally to record envelope delay, and simultaneously adjusts the slider of potentiometer 304 in a direction to match the phase of the signal in the output of the reference channel 205 to the phase of the output of the signal in the test channel 206 (i.e., to provide a zero phase difference).

In more detail, the modulated carrier signal as coupled to the test channel 206 passes over the test object 207 to the attenuator 208. Attenuator 208 has 10 settings 1 db apart which can be manually set to adjust the signal to the detector circuit for gain in the test object, if necessary. The output signal of the attenuator 208 is coupled across a network including resistors 213 and 215 having a grounded common connection 214, which network is coupled to the input circuit for detector 209.

The modulated carrier signal as coupled to the reference channel 205 passes over resistors 201 and 202 and attenuators 210 and 211. If the signal through the test object 207 is low in voltage, attenuators 210 and 211 provide means for reducing the voltage signal in the reference channel to match that in the test channel 206. Attenuator 210 has 10 settings 1 db apart which can be set manually for gross adjustment, whereas attenuator 211 has 10 settings .1 db apart which can be set manually for fine adjustment. The signal from the attenuators 210 and 211 is coupled across a network including resistors 216 and 218 whose common connection 217 is grounded, and thereby to the input circuit for detector 212.

Since detectors 209 and 212 are identical in structure, only detector 209 is described in detail. As shown in FIGURE 2, detector 209 comprises transistors 219 and 220, a bridge circuit 221 including a full wave rectifier, and associated circuitry. A negative feedback loop is connected from bridge 221 to transistor 219 to indirectly stabilize the rectified D.C. output of the bridge 221.

With transistors 219, 220 biased, as shown (including biasing rectifier 230A inserted for voltage drop), as the carrier modulated by 40 cycles is extended over the test object 208 and attenuator 208 and through condenser 222 to the base of transistor 219, an amplified version of such signal appears at collector 219A of transistor 219 and the base 220B of transistor 220. The signal is further amplified by transistor 220 and extended over collector 220A to terminal 223 of bridge 221, the opposite terminal thereof being connected to ground through a resistor network including resistors 225, 227, and variable resistor 227 as shown. A feedback conductor 228 is connected from terminal 224 to the emitter 229 of transistor 219.

It will be observed that the voltage signal appearing at the collector 219A and the base 220B is 180° out of phase with that incoming to base 219B; and the signal appearing at the collector 220A and the terminal 223 is 180° out of phase with that incoming to base 220B; and that the signal over conductor 228 back to the emitter 229 is therefore in phase with respect to the signal 219B. Due to the high gain in the circuit, the difference in potential between base 219B and emitter 229 is essentially held constant with only a minute fraction of the input signal appearing therebetween, and the current voltage across resistor 226 due to the current through transistor 220 and bridge 221 is essentially constant equal to the input voltage on base 219B. Variable resistor 227 is connected in the emitter circuit of transistor 219 to permit "fine" zero orientation of the recorder pen P relative to the graph paper.

During half cycles of the 300–4000 cycle signal when terminal 223 is more positive than the average potential, current flows from terminal 223 through rectifier 231, condenser 232 to terminal 224; and also from terminal 223, through rectifier 231, the resistor 308 of filter 301, condenser 233 to terminal 224 charging condensers 232 and 233 in one direction. During the other half cycles of the 300–4000 signal when terminal 223 is more negative than its average potential, current flows from terminal 224, through condenser 233, rectifier 234, to terminal 223; and from terminal 224, through condenser 232, resistor 308 of filter 301, and rectifier 234 to terminal 223 to charge the capacitors in the other direction. In each instance the direction of current flow through resistor 308 is the same and a rectified full wave signal therefore passes into filter 301.

The high degree of feedback used between the input and output circuit of the detector is provided to further reduce the harmonic distortion. That is, the resistor network including resistors 225, 226, 227, provides a voltage drop for the alternating current signals which are extended thereto over the rectifier bridge circuit 211, and such voltage drop is directly fed to the emitter of transistor 219. As a result, any deviation in the waveform of the output current from the input signal coupled over capacitor 222 to the base 219b of transistor 219 will be manifested as a strongly amplified antiphase signal fed to the output. In this manner, the alternating current modulated signal passed to the rectifier bridge will be a true copy of the input voltage to the detector.

Accordingly it should be noted that the demodulated signal will be free from distortion provided the rectifiers 234 and 231 have negligible back conduction.

The signal output of detectors 209, 212 is coupled to filters 301, 303 respectively. Since filters 301 and 303 are identical, only one of the filters is described thereat. As shown in FIGURE 3, filter 301 comprises an input resistor 308; a half section filter comprising capacitor 309, inductor 310, transformer 311, and capacitor 312; and output resistor 313. As noted above, a voltage signal comprising the full wave rectified 300–4000 cycle signal appears across the input resistor 308, and the 40 cycle envelope of this signal is passed by the half section filter to provide a 40 cycle voltage signal across output resistor 313. Resistor 314 in series with potentiometer 302 together are connected in parallel with output resistor 313. Since the lower end of resistors 313 and 314 are connected to ground, a 40 cycle voltage signal referenced to ground appears at the slider of potentiometer 302.

The output circuit of filter 303 including output resistor 315 and capacitor 315' is coupled to an RC delay network including condenser 316 connected in series with potentiometer 304, the lower side of resistor 315 and condenser 316 both being connected to ground. As a result thereof, a 40 cycle voltage signal referenced to ground appears at the slider of potentiometer 304.

The slider of potentiometer 302 is connected to the upper end of primary winding 305 of transformer 306, and the slider of potentiometer 304 is connected to the lower end of the primary winding 305 of transformers 306. With this arrangement, if the signals are equal in amplitude and in phase, they cancel, leaving no difference signal input to pass through transformer 306. If, however, these two signals are not equal in amplitude or out of phase, a difference or error signal is coupled over the transformer 306.

As indicated in FIGURE 3, band-pass filters are utilized to recover the 40 cycle per second signal from the rectified output of detectors 209, 212. These filters are purposely designed with a relatively broad bandwith since sharp filters have a very rapid phase variation with frequency in their band pass. Further, if the pass band is limited to a few cycles, even an extremely small variation in modulating frequency would cause errors in the output if the phase characteristics of the band pass filters in the reference and test channels are not exactly equal.

In the provision of a reasonable loss factor at the low 40 cycle frequency, it is necessary to use iron core coils. However, iron core coils, even though made of dust-core toroids, are slightly non-linear due to the properties of the iron, and therefore the inductance will change with the signal level, and any attenuation variations in a test object would be reflected in a phase variation in the band-pass filter to provide a false indication of delay variation. Thus the use of the broad band-pass filters renders the filtering portion of the system insensitive to amplitude variations. A band-pass filter is used rather than a low pass filter in order to permit use of the transformer 311 in the band-pass filters 301 and 303 to isolate the bridge circuit 221 in the detector 209 from ground.

The error signal provided by the comparison of the signal output of the two channels at transformer 306 is amplified by amplifier 317, and filter 318 removes any second harmonic (i.e. 80 cycles) remaining in the signal. The output signal of filter 318 is further amplified by amplifier 319, and any third harmonic (i.e. 120 cycles)

remaining is removed by filter 320. The signal is further amplified by amplifier 321, and any signal above 160 cycles which might have been propagated over the path or might have been generated by preceding equipment is filtered out by a low pass filter 321'. It will be appreciated that the components 317–321' may be replaced by other amplifier-filter arrangements without departing from the scope of the invention. Thus, by way of example, if it is desired to reduce the value of the delay encountered in the illustrated filter amplitude network to a smaller value, it is only necessary to replace such components by a single amplifier and a single low-pass filter. In any of such arrangements, the signal is then coupled to power amplifiers 322 and 323, which have velocity feedback damping controls 322A, 323B respectively associated therewith, and the amplified signal is then coupled to control windings 324 and 325 of servos X and X' respectively.

It will be recalled that a forty cycle reference signal is coupled over conductors 130A and 130B in the direction of servos X and X', the forty cycle signal on conductor 130A passing through phase shifting network 328 and amplifier 329 to reference winding 330 of servo X, and the 40 cycle signal on conductor 130B passing through phase shifting network 331, amplifier 332 to reference winding 333 of servo X'.

In passing through the various equipments from the comparison circuits including transformer 305 to the amplifiers 322, 323 a phase shift of the error signal itself may occur due to the inherent characteristics of the equipment. The phase shifting networks 328 and 331 each contain a manual control (not shown) by means of which the 40 cycle signal in the reference winding is shifted in phase. The manner of effecting such setting is now described.

With the system in equilibrium as it would be, for example, with strapping across the test object, and with the slider of resistor 302 in the middle position and the slider of resistor 304 in its uppermost position:

(1) The pen P' (FIGURE 6) manually is moved from the extreme right position corresponding to zero delay slightly to the left, causing servo motor 335 (X') to turn counterclockwise, in turn causing the slider of resistor 304 to move down slightly, creating an error signal. Thereupon the manual control in phase shift network 328 is adjusted until the signal in reference winding 330 is in phase with the error signal in control winding 324 (i.e. the armature 334 does not turn) so that servo X does not respond to change in delay. The pen P' is then returned to the zero position.

(2) The pen P (FIGURE 5) manually is moved from the central position slightly to the left and right causing servo motor 334 to turn which causes the slider of potentiometer 302 to slide down and up slightly, creating an error signal. Thereupon the manual control in phase shift network 331 is adjusted until the signal in reference winding 333 is in phase with the error signal in control winding 325 (i.e. armature 335 does not turn) so that servo X' does not respond to change in amplitude. The pen P is then returned to the zero position.

The adjustment range in networks 328, 331 is such as to prevent setting of response of the servo motor 180° out of phase with the correct setting.

In operation, as the test signals are coupled to the reference and test channels 205, 206 and the resultant error signals are coupled to the servos X and X', armatures 334 and 335 operate to adjust the sliders on potentiometers 302 and 304 to compensate for the attenuation distortion and envelope delay, respectively, which gave rise to the attenuation and delay components of the error signal. As the armatures 334 and 335 on servos X and X' rotate in adjustment of the sliders on potentiometers 302 and 304 the pens P and P' of the recorders are moved horizontally to record the attenuation distortion and envelope delay. Since the servos Y and Y' are operating to move the pens vertically with each change of frequency, a graph of attenuation distortion vs. frequency and a graph of envelope delay vs. frequency are obtained.

More specifically, it is first assumed that the phase of the voltage in reference winding 330 of servo X is as shown in FIGURE 7A (the amplitude or length not being to scale), and that the phase of the voltage in reference winding 333 is as shown in FIGURE 7B. It is further assumed that with the terminals of the test object strapped, or with no attenuation distortion or delay occasioned by the test object, the slider of potentiometer 302 is in the center, corresponding to the position of the pen P (FIGURE 5) midway across the horizontal axis of the graph paper which represents 0 db; and that the slider of potentiometer 304 is at the uppermost position, corresponding to the position of pen P' (FIGURE 6) at the extreme right edge of the recorder which represents 0 delay.

Various deviation conditions occasioned by the insertion of the test object in the test channel are now assumed for exemplary purposes, and in the following description directed thereto, T represents test channel vector output at the slider of resistor 302, R represents reference channel vector output at the slider of resistor 304, E represents error signal input to the primary 305 of transformer 306, and E' represents amplified error signal input to control windings 324 and 325.

(1) *No attenuation distortion or envelope delay.*—The resultant output signals obtained for a condition in which there is no attenuation distortion or envelope delay is shown in FIGURE 7C. As there shown, two identical vectors designated T and R are shown in superposed relation, the length of vector T representing, at a given instant, the amplitude of the output voltage signal of the test channel at the slider on potentiometer 302 and the position of vector T representing the phase thereof. The length of the vector R represents, at the same given instant, the amplitude of the output voltage signal of the reference channel at the slider of potentiometer 304, and the position of the vector R represents the phase thereof. As these two vectors are equal in amplitude and identical in phase, no difference or error signal appears, and absent any error signal, the slider of potentiometer 302 remains in its central position, and slider of potentiometer 304 remains at its uppermost position.

(2) *Amplitude of T less than R; no envelope delay.*—If now an attenuation occurs in the test object, the vector T of FIGURE 7C is reduced in amplitude and an error signal appears as shown in FIGURE 7D to effect a corresponding adjustment of potentiometer 302 by servo motor X in the reduction of the error signal to zero.

Referring to FIGURE 7D, with the amplitude of the signal T at the slider of potentiometer 302 at a given instant less than the amplitude of the signal R at the slider of potentiometer 304 but with the phase identical, an error signal E appears along the horizontal axis. For reference, the error signal is consistently represented as extending from the arrow of T to the arrow of R, and a dot is placed at the end of the error signal E nearest the arrow head of T, and an arrow head is placed on the end of E nearest the arrow head of R. The dot is considered the origin of E.

If the origin of E is now referred to a new set of axes, and lengthened as shown in FIGURE 7E (the increased length being indicative of amplification and not to scale i.e., in this explanation it is assumed that there is no resultant phase shift in the chain including components 317, 318, 319, 320, 321, 321' and 322 or 323, and since some phase shift is likely to occur, the phases on windings 330 and 333 are accordingly adjusted manually), and vector E' is transferred to FIGURE 7A, vector E' will be at right angles to vector 330 of FIGURE 7A indicating a quadrature of signals in the windings 330 and 324, whereby the armature 334 of servo X turns in the clockwise direction to (1) move the pen P (FIGURE 5) from its central position to the right—the direction of attenuation or decreasing db; (2) move the slider of potentiometer 302 upwardly to increase the attenuation and the length of vector T, whereby T again attains the length of R. If the vector E' of FIGURE 7E is referred to the axes of FIGURE 7B, vectors 333 and E' will be in phase coincidence (i.e., the voltage signals in the windings 333 and 325), so that no turning of armature 335 of servo X' occurs.

(3) *Amplitude of T greater than R; no envelope delay.*—Assuming now, no envelope delay, and an increase in attenuation in the test object which is such that a change in the vectors would occur as shown in FIGURE 7C and FIGURE 7F (i.e., vector T becoming longer than vector R), an error signal E appears which is in the opposite direction compared to FIGURE 7D. If vector E' of FIGURE 7G is referred to the axes of FIGURE 7A, a quadrature relationship of vectors exists and hence voltages occur in windings 330 and 324 (but in an opposite sense than in Example 2 above) whereby the armature 334 of servo X turns in a counterclockwise direction to (1) control the pen P (FIGURE 5) to move from the central position to the left—the direction of gain or increasing db; (2) control the slider of potentiometer 302 to move downwardly to decrease the length of vector T to the length of vector R. If the vector E' of FIGURE 7G (which corresponds to vector E of FIGURE 7) is referred to the axes of FIGURE 7B, it is shown that a 180° phase relationship exists and armature 335 does not turn.

(4) *Amplitude of T and R the same; more envelope delay in test channel.*—Assuming now that there is no attenuation distortion and that envelope delay occurs in the test channel as represented by the vectors (FIGURE 7C and FIGURE 7H), an error signal E is provided, the corresponding amplified error signal E' being shown in FIGURE 7I. Referencing vector E' of FIGURE 7I to the axes of FIGURE 7A shows that an essentially coincident relationship exists, whereby the voltage signals in windings 330 and 324 are essentially in phase and essentially no turning of armature 334 occurs. Referencing vector E' of FIGURE 7I to the axes of FIGURE 7B, we find an essentially quadrature relationship, and armature 335 turns counterclockwise to (1) move pen P' (FIGURE 6) along the horizontal axis from its extreme right hand position toward the left to thereby indicate an increasing delay in the test channel and to (2) control the slider on potentiometer 304 to move downwardly to insert a delay into the output of channel R to bring vector R of FIGURE 7H into coincidence with vector T.

(5) *Amplitude of T and R the same; less envelope delay in test channel.*—Assuming now for purposes of example that no attenuation occurs in the test channel, and that the envelope delay in the test channel is reduced by an amount represented by the change in the vectors from the showing in FIGURE 7H (when R had attained the position T) to the showing in FIGURE 7J. As a result an error signal E, such as shown in FIGURE 7J is provided, the corresponding amplified error signal E' being shown in FIGURE 7K. Referencing vector E' of FIGURE 7K to the axes of FIGURE 7A, an essentially 180° relationship is noted, and hence, with the voltage signals in windings 330 and 324 essentially 180° out of phase, very little turning of armature 334 occurs. Referencing vector E' of FIGURE 7K to the axes of FIGURE 7B, an essentially quadrature relationship is noted which is opposite in direction to that obtained with reference to FIGURE 7I, whereby rotation of armature 335 occurs in the clockwise direction to (1) move pen P' (FIGURE 6) from its position to the left of the 0 delay position back to the 0 delay position—the direction of movement indicating decreasing delay in the test channel; (2) move the slider on potentiometer 304 back up toward its uppermost position to decrease delay in the output of channel R and bring the vector R into coincidence with vector T.

(6) *Amplitude of T less than R; T lagging R.*—Assuming a change in the vectors as would occur in going from FIGURE 7C to FIGURE 7L (i.e., a decrease in attenuation distortion and an increase in time delay of the signal at the slider of potentiometer 302), an amplified error signal E', such as shown in FIGURE 7M is generated.

It will be seen that this error signal E' has a vertical component A (attenuation component) and a horizontal component D (time delay component). If FIGURE 7M is referenced to the axes of FIGURE 7A, the amplitude component D is found to be in quadrature with the vector representing the voltage in winding 330. If FIGURE 7M is referenced to the axes of FIGURE 7B the time delay component A is found to be in quadrature with the vector representing the voltage in winding 333. Armature 334 is then rotated in the clockwise direction to (1) move pen P (FIGURE 5) to the right to record an attenuation of the signal of the test channel as compared to the reference channel; (2) move slider of potentiometer 302 upwardly to increase the amplitude of the test channel signal output to reduce the amplitude component of the error signal. Armature 335 turns in the counterclockwise direction to (1) move pen P' (FIGURE 6) to the left to record an increase in envelope delay in the test channel; (2) move slider of potentiometer 304 downwardly to insert envelope delay in the signal from channel R, and thereby cause vector R of FIGURE 7L to assume the position of vector T.

(7) *Amplitude of T more than R; T lagging R.*—Assuming a change in the vectors such as would occur in going from FIGURE 7C to FIGURE 7N (i.e., an increase in attenuation and an increase in time delay, a corresponding amplified error signal E' shown in FIGURE 7P is provided. It will be seen that this error signal E' has a vertical component A (delay component) and a horizontal component D (attenuation component). If FIGURE 7P is referenced to the axes of FIGURE 7A, the amplitude component D is found to be in quadrature with the vector representing the voltage in winding 330. If FIGURE 7P is referenced to the axes of FIGURE 7B, the time delay component A is found to be in quadrature with the vector representing the voltage in winding 333.

As a result, armature 334 turns in the counterclockwise direction to (1) move pen P (FIGURE 5) to the left to thereby record an increase in the amplitude of the signal in the test channel as compared to the reference channel; (2) move slider of potentiometer 302 downwardly to decrease the amplitude of the test channel output signal to transformer 306. Armature 335 turns in a counterclockwise direction to (1) move pen P' (FIGURE 5B) to the left to thereby record an increase in envelope delay; (2) move slider of potentiometer 304 downwardly to insert envelope delay in the signal coupled by channel R to transformer 306, and thereby control vector R of FIGURE 7N to assume the position of vector T.

(8) *Amplitude of T more than R; T leading R.*—Assuming a change in the vectors as would occur in going from the final position noted in section 6 above in which vector R (FIGURE 7L) had attained the position of T, to FIGURE 7Q in which vector T increases and assumes a lead over vector R, an amplified error signal E' such as shown in FIGURE 7R is provided by the system. It will be seen that error signal E' has an amplitude component D and time delay component A. Referencing FIGURE 7R to the axes of FIGURE 7A, vector D will be seen to be in quadrature with the vector representing the reference voltage of winding 330. Referencing FIGURE 7R to the axes of FIGURE 7B, vector A will be seen to be in quadrature with the vector representing the voltage in winding 333. Armature 334 will turn counterclockwise to (1) move pen P (FIGURE 5) to the left to thereby record an increase in amplitude; (2) move the slider of potentiometer 302 downwardly to decrease the amplitude of the test channel signal output to transformer 306. Armature 335 will turn counterclockwise to (1) move pen P' (FIGURE 6) to the right to indicate less delay in the test channel; (2) move the slider of potentiometer 304 upwardly to insert less delay in the reference channel signal output to transformer 306.

(9) *Amplitude of T less than R; T leading R.*—Assuming a change in the vectors as would occur in going from the final position of item 6 in which vector R (FIGURE 7L) had attained the position of T to FIGURE 7S in which vector T decreased and assumed a lead over vector R, an amplified error signal E' such as shown in FIGURE 7T is provided. It will be seen that error signal E' has an amplitude component D and time delay component A. If FIGURE 7T is referenced to the axes of FIGURE 7A, vector D will be seen to be in quadrature with the vector representing the reference voltage of winding 330. If FIGURE 7T is referenced to the axes of FIGURE 7B, vector A will be seen to be in quadrature with the vector representing the reference voltage in winding 333. Armature 334 will turn clockwise to (1) move pen P (FIGURE 5) to the right to record a decrease in amplitude; (2) move the slider of potentiometer 302 upwardly to increase the amplitude of the test channel signal output to transformer 306. Armature 335 will turn counterclockwise to (1) move pen P' (FIGURE 6) to the right to indicate less delay in the test channel; (2) move the slider of potentiometer 304 upwardly to insert less delay in the reference channel signal output to transformer 306.

*Error signal producing arrangement*

The manner of producing the difference or error signal will be considered in more detail at this point. With reference to the slider of adjustable potentiometer 302, its excursion produces a variation in the amplitude of the test channel signal which is coupled to the primary winding 305 of transformer 306. Potentiometer 302 and resistor 314 are connected in series across output resistor 313, and the resistance of potentiometer 302 comprises approximately 10 percent of the total resistance of resistors 302 and 314, whereby movement of the potentiometer between its extreme positions results in variation of the voltage signal in the order of ±5% with respect to ground which corresponds to ±.5 db on the attenuation distortion graph. Since no capacitance is connected in series with potentiometer 302, the slider on potentiometer 302 goes through its excursions without effecting a shift in phase.

Slider of potentiometer 304 in its excursion produces a variation in the phase of the reference channel output signal to the primary winding 305 of transformer 306, and negligible variation in the amplitude of the reference channel output signal. Since the value of condenser 316 is chosen so that it presents a high impedance at 40 cycles, most of the voltage drop across resistor 315 appears across the capacitor 316. In the disclosed arrangement only 2½% of the total voltage drop appears across resistor 304.

Figure 8:
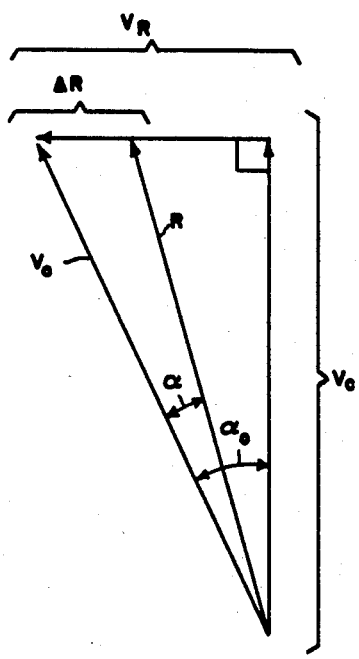
FIGURE 8 is a vector diagram illustrating the novel manner in which an RC circuit is used to introduce delay into the system.

The manner in which such control is obtained will be observed with reference to FIGURE 8 in which:

$V_R$=potential across resistor 304
$V_C$=potential across condenser 316

Since the potential across condenser 316 lags the potential across resistor 304 by ninety degrees, vector $V_R$ (FIGURE 8) is drawn at right angles to vector $V_C$. Also:

$V_0$=output voltage from filter which is coupled across the combination of resistor 304 and condenser 316.
Vector $V_0$ has an angle $\alpha_0$ with respect to vector $C_C$, and;
$\Delta R$=the change in resistance as the slider of potentiometer 304 moves downwardly from its upper end.

$\Delta R$ determines an angle $\alpha$ between vector $V_0$ and vector R (vector R being the vector representative of the voltage and angle of the slider of potentiometer 304). As $\Delta R$ goes from 0 in the $V_0$ position to $V_R$ in the $V_C$ position, little change occurs in the length of vector R, but vector R goes through a total angle $\alpha_0$. Stated in another manner, the excursion of the slider of potentiometer 304 has little effect on the voltage of the signal input to the lower end of primary 305 but has an appreciable effect on the angle of the signal, whereby delay is added to or taken from the signal to cause the delay of the reference channel to match the delay of the test channel.

Referring again to FIGURE 8, in the right triangle:

(1) $$\text{Tangent } \alpha_0 = \frac{V_R}{V_C}$$

(2) By Ohm's law $$V_R = iR_p$$

where $R_p$ is the total resistance across potentiometer 304

(3) By Ohm's law $$V_C = \frac{i}{\omega C}$$

where C is the capacity in farads of condenser 316, and $\omega = 2\pi \cdot 40$ Substituting (2) and (3) in (1)

(4) $$\text{Tangent } \alpha_0 = \frac{iR_p}{i/\omega C} = \omega C R_p$$

For small angles of the order involved, the tangent of the angle is very nearly equal to the angle itself in radians.

(5) $$\alpha_0 = \text{Tangent } \alpha_0$$

and substituting (5) in (4) we get:

(6) $$\alpha_0 = \omega C R_p$$

Also, because of the small angles involved:

(7) $$\frac{\alpha}{\alpha_0} = \frac{\Delta R}{R_p}$$

Substituting (6) in (7):

(8) $$\frac{\alpha}{\omega C R_p} = \frac{\Delta R}{R_p}$$

or (9) $$\frac{\alpha}{\omega C} = \frac{\Delta R}{1}$$

(10) $$\alpha = \omega \Delta R C$$

But, delay $\tau_R$ introduced into the reference channel by movement of the slider of potentiometer 304 downward to match the delay in the test object is given by the formula:

(11) $$\tau_R = \frac{\alpha}{\omega}$$

which means that the delay is a ratio between the angle $\alpha$ and the angular velocity $\omega$ in radians per second, $\omega$ being $2\pi \cdot 40$. (This ratio times 1,000,000 microseconds would give the delay in microseconds.)

Substituting (10) in (11) we get:

(12) $$\tau_R = \frac{\omega \Delta R C}{\omega} = \Delta R \cdot C$$

Thus the delay in seconds is equal to the change in resistance $\Delta R$ in ohms, which is variable and readily calculated and controlled, times the capacitance in farads of the condenser 316 which is fixed. Of a special importance is the fact that this delay may be inserted independent of frequency, and the position of the slider of potentiometer 304 therefore represents the absolute envelope delay.

The use in the system of two identical channels which differ only in the insertion of a test object in the test channel is important in that any undesirable propagation characteristics which may occur in a component in a channel will also occur in the other channel, and accordingly any errors which might be introduced into the signals transmitted over the test and reference channels, respectively, will in effect balance out.

It is further noted that the balancing arrangement which directly leads to the null method of determining the value of the error signal is extremely accurate and precise, and constitutes an important feature of the present system.

As indicated above, a novel velocity control circuit is used to brake each servo motor, and thereby effect precise movement of the pens P and P'. Each of the four servo motors, such as servo X, has its own braking circuit, such as circuit 322A, and as shown in FIGURE 11 the braking circuit includes a transformer 1101 including primary winding 1102 connected to the output of power amplifier 322, and a secondary winding 1103 connected to the input terminals A, B of a bridge circuit 1104. The bridge circuit 1104 includes a winding 1105 of the servo motor X connected in one leg thereof, and three other resistance legs 1106, 1107, 1108. Capacitor 1109 is connected in parallel with resistance 1107. The output terminals C, D of the bridge are connected respectively to ground and the input circuit of a phase shift network 1110, (where required) the output of the phase shift network 1110 being connected to the input circuit for the power amplifier 322.

The bridge circuit 1104 is approximately balanced for all frequencies with proper choice of bridge components. As the rotor turns, a voltage signal is induced in winding 1105 which is continually proportional to the velocity component of motor X. For the signal induced in the leg 1105 of the bridge circuit 1104 the bridge is not balanced and a signal of proportional value is coupled over the output terminals C, D to the phase shift network 1110 and power amplifier 322 to provide the proper braking action. Since the derived signal is continually proportional to the velocity of the motor, the applied braking force varies with the speed of the motor. Thus, at higher velocities of the servo motor a higher value braking signal is provided, and at lower velocities a lower value braking signal is provided.

The use of the bridge circuit 1104 effectively prevents feedback of the error signal over the braking control path.

The phase shift network 1110 is not required in many embodiments, and is illustrated to indicate the manner in which a phase shift may be introduced in the velocity braking signal to adjust the phase of the velocity signal feedback to a value which will provide the desired value of a torque. The arrangement including such adjustment is manifestly more flexible in the field.

The novel feedback network provides a braking action which stabilizes the servo system in a manner which was not possible in the use of the conventional servo "lead" networks, the lead networks in use having emphasized the harmonics and intermodulation signals to a degree which seriously interfered with the rather small error signal which is present at such point in the system.

The foregoing description, sets forth the manner in which the X, X' servo motors are controlled to effect the movement of the recording horizontal carriages along the X axis thereof in the recording of the values of the attenuation distortion and envelope delay of the test object. As noted above, such measurements are taken at each of a number of different frequencies, and a pair of servo motors Y and Y' are provided to move the vertical moving carriages of the recorders along the Y axis thereof as the tests are effected at the correspondingly different frequencies, whereby the graph indicates the results of the test at each of the different frequencies. The manner in which the Y, Y' servo motors effect such operation is now set forth in detail.

*Operation of servos Y and Y'*

Referring to the left of FIGURE 4, with closure of switch 101 the 110 volt, 60 cycle source energizes the primary 402 of transformer 403, which has three secondary windings of potentiometers 404, 405 and 406, the primary and secondary windings being poled as shown by the dots adjacent thereto. The three secondary windings are connected to three bridge circuits 407, 408 and 409 respectively, having two input signal potentiometers 410, 411 associated with bridges 408, 409, and three output potentiometers 401, 412 and 413 associated with bridges 407, 408 and 409 respectively. Bridge 407 includes resistors 414–417, bridge 408 includes resistors 410, 419–423 and bridge 409 includes resistors 424–429, resistors 415, 419 and 425 being of an adjustable type, for a purpose shown in more detail hereinafter.

Output potentiometer 413 is connected over conductor 433 and amplifier 431 and amplifier 438 to one winding of servo motor Y, and output potentiometer 412 is connected over conductor 432, amplifier 430, conductor 435 and amplifier 437 to one control winding for servo motor Y'. Feedback circuits 438A, 437A are connected across amplifiers 438, 437 respectively. Potentiometers 412 and 413 are manually controlled or set so that the pens P' and P of the pen recorders of FIGURES 5B and 5A respectively will be at approximately the middle of the graph papers vertically with potentiometers 401, 410, and 411 at their mid-points.

Variable resistors 415, 419, and 425 are set to provide a voltage across potentiometers 401, 410 and 411 such that excursion of these potentiometers from their center positions to the upper and lower extremes will coincide with movement of pens P' and P to the top and bottom extremities of the graph paper at corresponding excursions of the variable frequency generator 106. The movement of potentiometer 410 is controlled by servo-motor Y' in its movement, and the movement of potentiometer 411 is controlled by servo-motor Y in its movement.

For exemplary purposes it is assumed that all potentiometers in FIGURE 4 are at mid-position with pens P' and P at the middle of the graph paper vertically, and that the turns ratios of the transformer are such that 56 volts R.M.S. appears across secondaries 405 and 406; and 150 volts R.M.S. appears across secondary 404. In the following description, in order to simplify the explanation, the symbols + and − are used to refer to corresponding instantaneous values of the alternating current signals.

With potentiometer 412 at mid-position, a difference of 28 volts will exist between the slider and the top of resistor 423 which is assumed positive with respect to the slider, and a difference of 28 volts will exist between the slider and the bottom of resistor 422 which will be negative with respect to the slider. With the slider of potentiometer 413 at mid-position, a difference of 28 volts will exist between the slider and the top of resistor 429, which is assumed positive with respect to the slider, and a difference of 28 volts will exist between the slider and the bottom of resistor 428 which will be negative with respect to the slider 413.

With the center point of the resistance of potentiometer 401 grounded, a positive potential of 75 volts with respect to ground will exist at the top of resistor 417, and a negative potential of 75 volts with respect to ground will exist at the bottom of resistor 414. With potentiometer 401 set in the center the sliders 401, 410 and 411 will be at ground (i.e., 0 potential), and bridges 408 and 409 will be balanced.

More specifically, with slider 410 at 0 potential the potential at the top end of resistor 421 will be +28 volts and the bottom end of resistor 410 will be at −28 volts. Accordingly, the potential at the top end of resistor 423 will be +28 volts and the potential of the bottom of resistor 422 will be −28 volts. As slider 412 is in the center position, its potential will be 0 volt. With the existence of ground potential signal on conductor 432 which is connected to amplifier 430 for the control winding 433 of servo Y' no control action is effected. Similarly, with slider 411 at zero potential, no signal is coupled over conductor 433 and amplifier 431 in the direction of the control winding 434 for servo Y and no control movement is effected by the servo Y.

Assuming now that drive motor 102 in its operation advances the slider of potentiometer 401 upwardly to a position in which the potentiometer has a 1 volt potential positive with respect to ground (i.e. +1 volt), a +1 volt potential will also appear at the sliders of potentiometers 410 and 411.

Considering bridge 408 with the slider of potentiometer 410 at +1 volt, and a difference of 28 volts existing between the slider and the top of resistor 421, and difference of 28 volts existing between the slider and the bottom of resistor 418, the top of resistor 421 will be at +29 volts and the bottom of resistor 418 at —27 volts. Accordingly, the top of resistor 423 will be at +29 volts and the bottom of resistor 422 at —27 volts. The slider 412 will be mid-way between these voltages, i.e. at +1 volt. Accordingly, a +1 volt signal with respect to ground is transmitted over conductor 432 to amplifier 430 which in response thereto transmits positive signal with respect to ground (and shifted 90° in phase relative to the 110 volt, 60 cycle source), over conductor 435 to power amplifier 437 which, in turn, provides a signal of similar phase which is positive with respect to ground to control winding 433 of servo Y'.

Since reference winding 439 of servo Y' is energized by the 110 volt, 60 cycle source, and the signal from amplifier 437 to control winding 433 is shifted 90° in phase relative to the 110 volt, 60 cycle signal in winding 439 a quadrature relationship exists between the two windings to produce a maximum torque for rotating the armature of servo Y'.

Assuming that the windings are connected in such fashion as to cause the armature 441 to turn clockwise, with the occurrence of such signal, mechanical linkage, indicated schematically as 443, moves the wiper of potentiometer 410 upwardly to balance bridge 408. That is, the wiper of potentiometer 410 moves up until a difference of 1 volt exists between its former central position and the new position. Thereupon the potential of the top of resistor 421 will become +28 volts and the bottom of resistor 418 will become —28 volts. Accordingly, the potential of the top of resistor 423 will be +28 volts and the potential of the bottom of resistor 422 will be —28 volts. As the slider of potentiometer 412 is in the central position, it will be a zero volt or ground potential. Accordingly, the positive signal on conductor 432 is reduced toward zero and the output of amplifiers 430 and 437 decreases to terminate rotation of the armature 441 of servo Y'.

During such movement of the servo motor Y', the vertical moving carriage on the envelope delay frequency recorder (FIG. 6) is adjusted through a proportional vertical increment. In similar manner a +1 volt signal on conductor 433 results in servo Y driving potentiometer 411 upwardly to balance bridge 409, and a like movement of the vertical carriage of the amplitude deviation frequency recorder (FIGURE 5) is provided.

It is now assumed, for purposes of further explanation, that all of the potentiometers of FIGURE 4 are in mid-position, that reversing switch 102A has been operated, and that switch 101 is closed to move potentiometer 401 downwardly to a position of 1 volt negative with respect to ground (i.e., —1 volt) thereby providing a —1 volt potential for the sliders of potentiometers 410 and 411.

Considering bridge 408 with the slider of potentiometer 410 at —1 volt and a difference of 28 volts existing between the slider and the upper end of resistor 421 and a difference of 28 volts existing between the slider and the lower end of resistor 418, the upper end of resistor 421 will be at +27 volts and the lower end of resistor 418 at —29 volts. Accordingly, the upper end of resistor 423 will be at +27 volts and the lower end of resistor 422 at —29 volts. The slider of potentiometer 412 will be mid-way between these voltages, i.e., at —1 volt, and a —1 volt signal with respect to ground will be transmitted over conductor 432 to amplifier 430 which in response thereto couples a negative signal with respect to ground over conductor 435 to power amplifier 437. Amplifier 437 provides a signal which is negative with respect to ground and which is of a phase to control winding 433 of servo Y' which rotates armature 441 counterclockwise. Through mechanical linkage 443, the wiper of potentiometer 410 is moved downwardly to balance bridge 408, the wiper of potentiometer 410 moving downwardly until a difference of —1 volt exists between its former central position and the new position. Thereupon the potential of the top of resistor 421 will become +28 volts and the bottom of resistor 418 will become —28 volts, and the potential of the top of resistor 423 will be +28 volts, and the potential of the bottom of resistor 422 will be —28 volts. The slider of potentiometer 412 is now at zero volts or ground potential, and the negative signal on conductor 432 decreases to zero. Bridge 409 is controlled in similar fashion and operation of the Y and Y' servo motors in such manner effects corresponding movement of the vertical moving carriages on the two recorders (FIGURES 5 and 6) through proportional vertical increments.

In actual practice, the normal mode of operation is to have the reversing switch 102A in normal position as shown to dispose the motor to drive 105 and 401 in the forward direction. Potentiometers 401, 410, and 411 will be at the lowermost position with pens P and P' at the bottom of the graph paper. As switch 101 is thrown, potentiometers 401, 410, and 411 move upward and servos Y and Y' turn clockwise to move pens P and P' upwardly until limit switch 103 on the pen recorder apparatus opens. At such time transfer switch 102A closes a circuit to the reversing winding of motor 102 to control same to move the sliders toward the normal bottom position and thereby a retrace of the test results is effected. If no retrace is required, the pens are removed from the graph paper during the return retrace. As the retrace is completed, limit contacts 104 open, contacts 103 close, and contacts 102A are operated to the illustrated position to initiate a further trace in the forward direction. The device operates continually in such manner until the start switch 101 is opened.

*Zero setting of pens*

When the slider of potentiometer 302 is in the center position with the test object strapped across the pen P (FIGURE 5A) should be in the center of the paper horizontally. Potentiometer 227 (FIGURE 2) provides means for effecting precise location of the pen P relative to the paper horizontally, movement of the slider of potentiometer 227 downwardly effecting movement of the pen P to the right and movement of the slider of potentiometer 227 upwardly effecting movement of the pen P to the left.

With the slider of potentiometer 304 in the upper position and the test object strapped across, the pen P' (FIGURE 5B) should be in the extreme right position. Variable capacitors 336 and 337 (FIGURE 3) provide means for effecting the precise positioning of pen P' horizontally. Variable capacitors 336 and 337 together provide a variation in capacitance across resistor 313 from .0001 microfarads to .01 microfarads in .0001 steps. Capacitor 336 is variable in ten steps from .0001 to .001. Capacitor 337 is variable in ten steps from .001 to .01.

*Range switching*

Selector means are provided to permit selection of different ranges of operation. The selector means basically comprise a gang switch and associated circuitry connected across the outputs of the filters 301 and 303 in the test and reference channels 206, 205, and as shown in FIGURES 9 and 10, the selector switch has three wipers 902, 1006, and 1015, which move together between associated contacts A–F with movement of a common actuator (not shown).

As shown in FIGURE 9 wiper 902 in positions A–E, connects resistor 900 across the output conductors of filter 301. In position F, wiper 902 connects resistor 901 in parallel with resistor 314.

As shown in FIGURE 10, wiper 1005 in position A connects resistors 1000, 1001, 1002, and 1003 in series with the parallel connection of resistor 304′ and potentiometer 304; in position B connects resistors 1001, 1002, and 1003 in series therewith; in position C, connects resistors 1002 and 1003 in series therewith; in position D, connects resistor 1003 in series therewith; and in positions E and F connects no additional resistors in series with parallel potentiometer 304 and resistor 304′.

Wiper 1006 in positions A–E connects resistor 1004 in parallel with resistors 304 and 304′ and in position F disconnects resistor 1004 from such parallel connection.

Wiper 1015 in its various positions connects the following equipments across the output leads of filter 303: in position A, capacitor 1007; in position B, capacitor 1008 in parallel with resistor 1009; in position C, capacitor 1010 in parallel with resistor 1011; in position D, capacitor 1012 in parallel with resistor 1013; in position E, resistor 1014; in position F, capacitor 1007. The function of resistor 900, capacitor 1007 and combinations 1008/1009, 1010/1011 etc., is to maintain a constant load on the filters. Failing such arrangement there might be amplitude and phase variations between the filter outputs resulting in shift of "zero points" in the switching range. The positions of wiper 1015 provide ranges as follows:

POSITION A
Amplitude: 0.1 db per inch. Total 1 db ($\pm 0.5$ db)
Delay: 10 microseconds per inch in 400–500 microsecond range

POSITION B
Amplitude: 0.1 db per inch. Total 1 db ($\pm 0.5$ db)
Delay: 10 microseconds per inch in 300–400 microsecond range

POSITION C
Amplitude: 0.1 db per inch. Total 1 db ($\pm 0.5$ db)
Delay: 10 microseconds per inch in 200–300 microsecond range

POSITION D
Amplitude: 0.1 db per inch. Total 1 db ($\pm 0.5$ db)
Delay: 10 microseconds per inch in 100–200 microsecond range

POSITION E
Amplitude: 0.1 db per inch. Total 1 db ($\pm 0.5$ db)
Delay: 10 microseconds per inch in 0–100 microsecond range

POSITION F
Amplitude: 0.2 db per inch. Total 2 db ($\pm 1$ db)
Delay: 50 microseconds per inch in 0–500 microsecond range The maximum angle between vectors T and R as illustrated in FIGURES 7H, 7J, 7L, 7N, 7Q, and 7S is only a matter of a few degrees in the actual units and has been exaggerated in these figures for purposes of simplifying the illustration. This can be appreciated by a consideration of the following:

(1) There are 1,000,000 microseconds in a second.
(2) At 40 cycles per second there are 25,000 microseconds per cycle.
(3) One cycle is 360°.
(4) Therefore a 100 microsecond range is $$\frac{100}{25,000} \times 360° = 1.44°$$

(5) A 500 microsecond range is $$\frac{500}{25,000} \times 360° = 7.2°$$

The close approximation of error signals E to vertical in FIGURES 7H and 7J can be appreciated therefrom.

Representative values

The following is a list of representative values for practicing the invention:

Motor Drive—908–R96 General Radio Company (102, 401)
Variable Frequency Generator—1304B General Radio Company (106)
Halltron Modulator—(Special) Ohio Semiconductors (116)
Hybrid Transformers—LS32 United Transformer Corporation (109, 135)
Transformers 403—Provides 150, 56, and 56 volts respectively across secondaries 404, 405, 406.
Pen Recorders—Autograph 3S X–Y Recorder (Modified) F. L. Mosely Co. X, X′, Y, Y′, 410, 411, 302, 316; FIG. 5, FIG. 6.

Potentiometers:
    129—200 ohms
    132—1 ohm
    302—5K
    304—5K
    401—50K
    410—3.5K
    411—3.5K
    412—1.5K
    413—1.5K Transistors:
    219—2N1309
    220—2N1309

Diodes:
    230A—1N658
    231, 234—1N658

Variable resistors:
    114A—25 ohms
    139—5 ohms
    227—15K
    415—180K
    419—5K
    425—5K Variable capacitors:
    336—.0001–.001 MF
    337—.001–.01 MF Attenuators:
    208, 210—1 db–10 db
    211—1 db–1 db Resistors:
    111—42.2 ohms
    114—18 ohms
    114B—82.5 ohms
    138—5 ohms
    143—316 ohms
    201–204—300 ohms
    213—301 ohms (1%)
    215—301 ohms (1%)
    225—10K (1%)
    226—100 ohms (1%)
    230—2.2K (5%)
    230B—21.5K (1%)
    230C—100 ohms (1%)
    1106—200 ohms
    1107—2.7K
    1108—6.2K
    230D—8.2K (5%)
    302′—45K
    304′—45K
    308—511 ohms
    313—10K
    314—36.8K precision wound, non-inductive
    414—10K
    416—20K
    417—10K 418—348 ohms
420—10K
421—348 ohms
422—2.61K
423—1.96K
424—348 ohms
426—10K
427—348 ohms
428—2.61K
429—1.96K
900—46K carbon film (1%)
901—32.6K precision wound, non-inductive
1000—900 ohms precision wound, non-inductive (.1%)
1001—900 ohms precision wound, non-inductive (.1%)
1002—900 ohms precision wound, non-inductive (.1%)
1003—900 ohms precision wound, non-inductive (.1%)
1004—1125 ohms (.1%)
1009—1.48M carbon film (1%)
1011—720K carbon film (1%)
1013—480K carbon film (1%)
1014—360K carbon film (1%)

Capacitors:
122—A composite of capacitors in parallel comprising approximately 60 microfarads tuned to 40 cycles with coil 120.
125—A composite of capacitors in parallel comprising approximately 1 microfarad tuned to 40 cycles with coil 124.
128—1000 mf.
222—50 mf.
230E—500 mf.
232, 233—1 mf.
309—4 mf.
312—.6 mf.
316—.1111 mf.
1007—1642 mmf.
1008—1031 mmf.
1010—558 mmf.
1012—208 mmf.
1109—1.4 mf.

It would be understood by one skilled in the art that proper shielding and careful physical layout of the circuit components is necessary to maintain the extremely low noise level consistant with the error signal magnitude which is a matter of a few tens of microvolts.

Although only a particular embodiment of the invention has been shown and described, it is apparent that modifications and alterations may be made therein, and it is intended in the appended claims to cover all such modifications and alterations as may fall within the true spirit and scope of the invention.

What is claimed is:

1. In a measuring device for measuring certain propagation characteristics of a test object comprising a reference channel having predetermined transmission characteristics, a test channel having transmission characteristics identical to said reference channel including means for connecting a test object therein, input means for coupling an amplitude modulated test signal comprising carrier and sideband signals simultaneously to said reference channel and said test channel, a first demodulation means for demodulating said sidebands against the carrier signal in said test channel, a second demodulation means for demodulating said sidebands against the carrier signal in said reference channel, means in each channel for recovering the envelope of the test signal from the signal output of said demodulation means and comparison means connected to the output of said reference channel and said test channel to compare the envelopes of the test signals including means operative to generate an error signal which has a value related to both the difference in delay and attenuation of said envelopes.

2. In a measuring device for measuring certain propagation characteristics of a test object comprising a reference channel having predetermined transmission characteristics, a test channel having transmission characteristics identical to said reference channel including means for connecting a test object therein, input means for coupling an amplitude modulated test signal comprising carrier and sideband signals simultaneously to said reference channel and said test channel, a first demodulation means for demodulating said sidebands against the carrier signal in said test channel, a second demodulation means for demodulating said sidebands against the carrier signal in said reference channel, means in each channel for recovering the envelope of the test signal from the signal output of said demodulation means, and comparison means connected to the output of said reference channel and said test channel to compare the envelopes of the test signals including means operative to provide an error signal which has a value related to the difference in delay of said envelopes.

3. In a measuring device for measuring certain propagation characteristics of a test object comprising a reference channel having predetermined transmission characteristics, a test channel having transmission characteristics identical to said reference channel including means for connecting a test object therein, a first demodulation means in said test channel, a second demodulation means in said reference channel, input means for coupling an amplitude modulated carrier test signal simultaneously to said reference channel and said test channel, means in each channel for recovering the envelope of the test signal from the signal output of said demodulation means, and comparison means connected to the output of said reference channel and said test channel to compare the envelopes of the test signals including means operative to provide an error signal related to the difference in attenuation of said envelopes.

4. In a measuring device for measuring certain propagation characteristics of a test object comprising a reference channel, a test channel including means for connecting a test object therein, input means for coupling a test signal comprising carrier and sideband signals simultaneously to said reference channel and said test channel, a first demodulation means for demodulating said sidebands against the carrier signal in said test channel, a second demodulation means for demodulating said sidebands against the carrier signal in said reference channel, means in each channel for recovering the envelope of the test signal from the signal output of said demodulation means, comparison means connected to compare envelopes to the test signals including means operative to provide an error signal which is related to the difference in delay of said envelopes, and compensating means operative to insert a delay in the output of one of said channels of a value to reduce said delay component of said error signal to a predetermined value.

5. A measuring device as set forth in claim 4 in which said compensating means includes a resistance-capacitance network. and means operative responsive to coupling of the error signal thereto to adjust the delay produced by the resistance-capacitance network to reduce the delay component of said error signal to a predetermined value.

6. In a measuring device for measuring certain propagation characteristics of a test object comprising a reference channel, a test channel including means for connecting a test object therein, a first demodulation means in said test channel, a second demodulation means in said reference channel, input means for coupling an amplitude modulated carrier test signal simultaneously to said reference channel and said test channel, means in each channel for recovering the envelope of the test signal from the signal output of said demodulation means, comparison means connected to the output of said reference channel and said test channel to compare the envelopes of the test signals including means operative to provide an error signal related in amplitude to the difference in attenuation of said envelopes, and compensating means operative to insert attenuation in the output of one of said channels of a value to reduce the amplitude component of said error signal to a predetermined value.

7. In a measuring device for measuring certain propagation characteristics of a test object over a frequency range comprising a reference channel having predetermined transmission characteristics, a test channel having transmission characteristics identical to said reference channel including means for connecting a test object therein, demodulation means in each of said channels, input means including variable carrier frequency generator means, means connected to said generator for generating a modulated carrier test signal having a carrier frequency variable over said range, and means for coupling said test signal to said reference channel and simultaneously to said test channel, comparison means connected to the output of said reference channel and said test channel including means operative to provide an error signal component representative of the difference in delay and attenuation of the demodulated signals which appear at the output of said reference and said test channel, and compensating means including a first servo means operative to insert an attenuation in one of said channels of a value to reduce the amplitude component of said error signal to zero, and a second servo means operative to insert a delay in the other one of said channels of a value to reduce the delay component of the error signal to zero.

8. An arrangement as set forth in claim 7 which includes a recorder means comprising means connected to said frequency generator means to record the value of the variable carrier frequency at which the test signal is generated, and means controlled by said first servo means operative to simultaneously record the attenuation associated with the carrier frequency.

9. An arrangement as set forth in claim 7 which includes a recorder means comprising means connected to said frequency generator means to record the value of the variable carrier frequency at which the test signal is generated, and means controlled by said second servo means operative to simultaneously record the envelope delay associated with the carrier frequency.

10. In a measuring device for measuring certain propagation characteristics of a test object comprising a reference channel, a test channel including means for connecting a test object therein, demodulation means in each of said channels, input means for coupling a modulated carrier test signal simultaneously to said reference channel and said test channel, comparison means connected to the output of said reference channel and said test channel including means operative to provide an error signal having a component related to the difference in envelope delay of the demodulated signals which occur at the output of said reference and said test channel, compensating means including servo means operative to insert a delay in one of said channels of a value to reduce the delay component of the error signal to zero, and recorder means controlled by movement of said servo means operative to provide a record of the value of the envelope delay of the modulated carrier signal which occurs with passage over said test object.

11. In a measuring device for measuring certain propagation characteristics of a test object comprising a reference channel, a test channel including means for connecting a test object therein, demodulation means in each of said channels, input means for coupling a modulated carrier test signal simultaneously to said reference channel and said test channel, comparison means connected to the output of said reference channel and said test channel including means operative to provide an error signal having a component related to the difference in attenuation of the demodulated signals which occur at the output of said reference and said test channel, compensating means including servo means operative to insert an attenuation in one of said channels of a value to reduce said error signal component to zero, and recorder means controlled by movement of said servo means operative to provide a record of the value of the attenuation of signals which occur with passage over said test object.

12. In a measuring device for measuring certain propagation characteristics of a test object comprising a reference channel, a test channel including means for connecting a test object therein, signal generator means including a variable carrier frequency generator operable to provide different frequency signals "$f_c$" in a predetermined pattern, modulator means operative to modulate said signals with a relatively low frequency signal "$f$" to provide carrier suppressed output signals $f_c \pm f$ and means for thereafter adding said "$f_c$" frequency with said output signals, input means for coupling the resultant added signals simultaneously to said reference channel and said test channel, and comparison means connected to the output of said reference channel and said test channel including means operative to provide an error signal related to the difference in delay of the signals which occur at the output of said reference channel and said test channel.

13. An arrangement as set forth in claim 12 in which said modulator means include an oscillator circuit for providing signals of said "$f$" frequency, and Hall plate means controlled by said oscillator circuit having an input circuit connected to said variable frequency generator, and an output circuit connected at right angles to said input circuit, and also connected with the output of said Hall plate circuit to said input means for said reference and test channels.

14. In a measuring device for measuring certain characteristics of a test object comprising a reference channel, a test channel including means for connecting a test object therein, signal generator means operative to generate a carrier signal at different frequencies modulated by a low frequency signal "$f$," input means for coupling the generated signals simultaneously to said reference channel and said test channel, a detector circuit connected in each channel operative to provide by rectification an output signal proportional to the average amplitude of said modulated channel signal thus comprising a direct current component proportional to said carrier signal and a component of frequency "$f$" related to the envelope of the modulated carrier signal, a filter circuit operative to pass the "$f$" frequency signal to an output circuit for its channel, and comparison means connected to the output of said reference channel and said test channel including means operative to provide an error signal related to the difference in phase and attenuation of the signals which are coupled to the output of said reference and said test channel.

15. A measuring device as set forth in claim 14 in which said filter comprises a broad band-pass filter, and the output circuit of one of said channels includes an adjustable circuit operable to insert additional delay in the output of the one channel and the output circuit of the other of said channels includes an adjustable circuit operable to insert additional attenuation in the output of the other channel.

16. In a measuring device for measuring certain characteristics of a test object comprising a reference channel, a test channel including means for connecting a test object therein, demodulation means in each of said channels, signal generator means operative to generate a carrier signal at different frequencies, oscillator means for generating a low frequency signal "$f$," means for modulating said carrier signals with said low frequency signal, input means for coupling the modulated signals simultaneously to said reference channel and said test channel, comparison means connected to the output of said reference channel and said test channel including output means operative to provide an error signal having a component related to the difference in phase of the signals which occur at the output of said reference and said test channel, and compensating means including a delay circuit for inserting delay in the output of one of said channels, servo means having one winding means connected to the output means to be energized by said error signal and a second winding means connected to be energized by a reference signal derived from said oscillator circuit, and rotor means controlled by said windings to adjust the delay circuit to insert a delay in said one channel of a value to reduce said component of the error signal to zero.

17. In a measuring device for measuring certain characteristics of a test object comprising a reference channel, a test channel including means for connecting a test object therein, demodulation means in each of said channels, signal generator means operative to generate a carrier signal at different frequencies, oscillator means operative to generate a frequency signal "$f$," means for modulating said carrier signals with said signal "$f$," input means for coupling the modulated signals simultaneously to said reference channel and said test channel, comparison means connected to the output of said reference channel and said test channel including output means operative to provide an error signal having a component related to the difference in attenuation of the signals which occur at the output of said reference and said test channel, and compensating means including attenuating means operative to insert an attenuating signal into one of said channels, servo means having one winding means connected to the output means to be energized by said error signal, and a second winding means connected to be energized by a reference signal derived from said oscillator circuit, and rotor means controlled by said windings to adjust the attenuating means to insert attenuation into said one channel of a value to reduce said component of the error signal to zero.

18. In a measuring device for measuring certain characteristics of a test object comprising a reference channel, a test channel including means for connecting a test object therein, demodulation means in each of said channels, input means for coupling modulated carrier signals of different frequencies to said reference channel in a given pattern and simultaneously to said test channel, comparison means connected to the output of said reference channel and said test channel including output means operative to provide an error signal having a component related to the difference in a propagation characteristic of the signals which occur at the output of said reference and said test channel, and compensating means including an adjustable circuit means operative to insert a compensating signal in one of said channels of a value to reduce said error signal component to zero, including a servo motor operatively controlled by the error signal to adjust said adjustable circuit in the compensating action, and a servo velocity control circuit operative to provide a braking signal for the servo motor continually proportional to the velocity of the servo motor.

19. In a measuring device as set forth in claim 18 in which said servo velocity control circuit includes an amplifier circuit connected to said output means, a bridge circuit connected to the output of said amplifier, a winding on said servo connected in one leg of said bridge circuit, and means for coupling the output of said bridge circuit to the input of said amplifier circuit.

References Cited in the file of this patent

UNITED STATES PATENTS

| | | |
|---|---|---|
| 2,047,782 | Jensen | July 14, 1936 |
| 2,557,798 | Reitz | June 19, 1951 |
| 2,632,792 | Selz | Mar. 24, 1953 |
| 2,639,411 | Schafer | May 19, 1953 |
| 2,745,067 | True et al. | May 8, 1956 |
| 2,760,155 | Kelly | Aug. 21, 1956 |
| 2,911,592 | Colker et al. | Nov. 3, 1959 |
| 2,970,258 | Sinclair | Jan. 31, 1961 |

FOREIGN PATENTS

| | | |
|---|---|---|
| 352,752 | Great Britain | July 16, 1931 |